United States Patent
Huang et al.

(10) Patent No.: US 11,830,458 B2
(45) Date of Patent: Nov. 28, 2023

(54) UNDER DISPLAY SENSORS, SYSTEMS AND METHODS

(71) Applicant: Vishay Semiconductor GmbH, Heilbronn D (DE)

(72) Inventors: Cheng Chieh Huang, Jhongshan District (TW); Wei Chien Wang, New Taipei (TW); Yu Hao Kao, New Taipei (TW)

(73) Assignee: Vishay Semiconductor GmbH, Heilbronn D (DE)

( * ) Notice: Subject to any disclaimer, the term of this patent is extended or adjusted under 35 U.S.C. 154(b) by 0 days.

(21) Appl. No.: 17/883,200

(22) Filed: Aug. 8, 2022

(65) Prior Publication Data

US 2022/0383793 A1    Dec. 1, 2022

Related U.S. Application Data

(62) Division of application No. 16/860,198, filed on Apr. 28, 2020, now Pat. No. 11,430,407.

(Continued)

(51) Int. Cl.
*G09G 3/20* (2006.01)
*G01J 1/42* (2006.01)
(Continued)

(52) U.S. Cl.
CPC .............. *G09G 5/10* (2013.01); *G01J 1/4204* (2013.01); *G01S 17/08* (2013.01); *G09G 3/006* (2013.01);
(Continued)

(58) Field of Classification Search
CPC ......... G06F 2203/04108; G06F 3/0412; G06F 3/04166; G06F 3/0421; G06F 3/0425; G09G 2310/0237; G09G 2320/0626; G09G 2320/064; G09G 2360/141; G09G 2360/144; G09G 5/10; G09G 5/18;
(Continued)

(56) References Cited

U.S. PATENT DOCUMENTS 9,459,723 B2 * 10/2016 Zeng ................. H04M 1/72454
10,015,380 B2    7/2018 Roquemore, III
(Continued)

FOREIGN PATENT DOCUMENTS

EP    2 141 688 A1    1/2010
EP    3 522 146 A1    8/2019

*Primary Examiner* — Hong Zhou
(74) *Attorney, Agent, or Firm* — Volpe Koenig

(57) ABSTRACT

A display device and a method for operating a display device disclosed herein include transmitting a proximity signal from a proximity sensor, the proximity sensor being positioned under a lower surface of a surface layer with an illumination component being positioned between the surface layer and the proximity sensor, in response to the illumination component being deactivated, receiving a reflected proximity signal based on the proximity signal, determining a proximity value based on the reflected proximity signal and modifying an operation of the display device based on the proximity value. The modifying the operation of the display device includes any one or a combination of activating the illumination component, deactivating the illumination component, or modifying a property of the illumination component.

16 Claims, 30 Drawing Sheets

Related U.S. Application Data

(60) Provisional application No. 62/906,039, filed on Sep. 25, 2019.

(51) Int. Cl.
  *G01S 17/08* (2006.01)
  *G09G 5/10* (2006.01)
  *G09G 3/00* (2006.01)

(52) U.S. Cl.
  CPC ......... *G09G 3/20* (2013.01); *G09G 2320/064* (2013.01); *G09G 2320/0626* (2013.01); *G09G 2330/12* (2013.01); *G09G 2360/141* (2013.01); *G09G 2360/144* (2013.01)

(58) Field of Classification Search
  CPC .. G09G 5/12; G09G 3/20; G09G 3/006; G01J 1/4204; G01S 17/08
  See application file for complete search history.

(56) References Cited

U.S. PATENT DOCUMENTS

| | | |
|---|---|---|
| 2007/0279369 A1 | 12/2007 | Yao et al. |
| 2012/0162636 A1 | 6/2012 | Sy |
| 2012/0194493 A1 | 8/2012 | Soto |
| 2012/0262408 A1* | 10/2012 | Pasquero .............. G06F 3/0421 345/174 |
| 2013/0231161 A1 | 9/2013 | Hsu et al. |
| 2014/0085245 A1* | 3/2014 | Baldwin ............... G01J 1/4228 250/341.7 |
| 2014/0176501 A1 | 6/2014 | Liou |
| 2016/0195916 A1* | 7/2016 | Shiozaki ............... G06F 1/1637 345/173 |
| 2017/0123552 A1 | 5/2017 | Brunet et al. |
| 2017/0147088 A1 | 5/2017 | Martinez et al. |
| 2017/0277323 A1* | 9/2017 | Kim ....................... G06F 3/0446 |
| 2019/0080668 A1 | 3/2019 | Holenarsipur et al. |
| 2020/0074956 A1* | 3/2020 | Zhou ........................ G09G 5/10 |
| 2020/0126495 A1* | 4/2020 | Zhou ....................... G06F 3/042 |
| 2020/0211474 A1* | 7/2020 | Kim ..................... G09G 3/3233 |
| 2021/0056896 A1 | 2/2021 | Greimel-Langauer et al. |

* cited by examiner

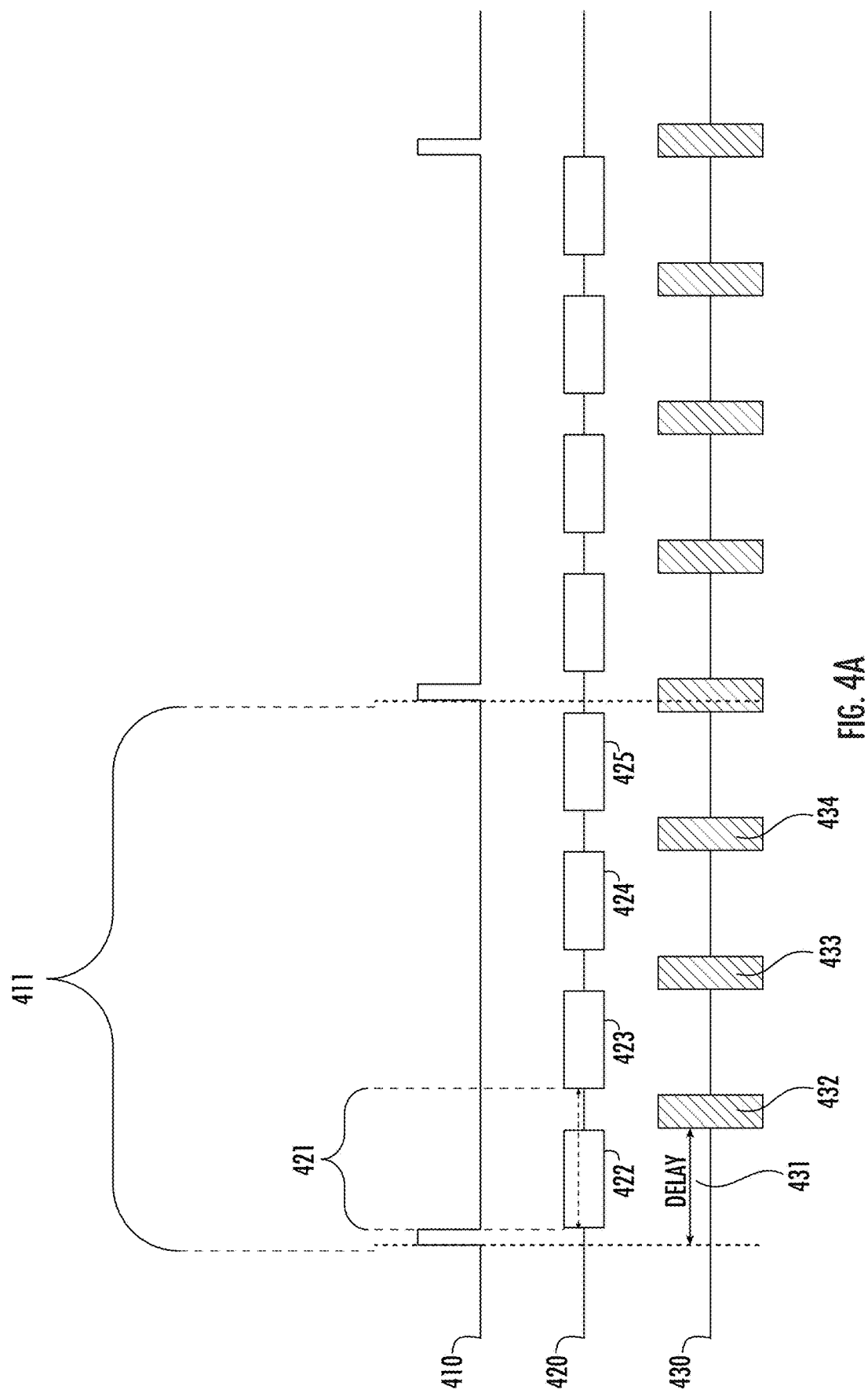

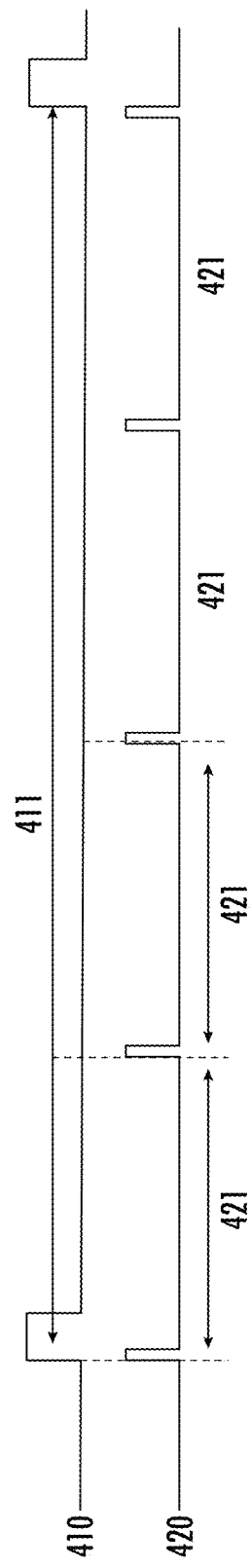

| REGISTER DEFINE | DESCRIPTION | R/W DEPTH | |
|---|---|---|---|
| 450 RGB_SYNC_IT | ALS INTEGRATION TIME PER-CYCLE<br>0000 = 500 uS<br>0001 = 550 uS<br>0010 = 600 uS<br>0011 = 650 uS<br>0100 = 700 uS<br>0101 = 750 uS<br>0110 = 800 uS<br>0111 = 850 uS<br>1000 = 900 uS<br>1001 = 950 uS<br>1010 = 1000 uS<br>1011 = 1050 uS<br>1100 = 1100 uS<br>1101 = 1150 uS<br>1110 = 1200 uS<br>1111 = 1250 uS | R/W [3:0] RGB_SYNC_IT SETTING | 451 |
| RGB_SYNC_IT_BANK | 00 = 1 x IT<br>01 = 2 x IT<br>10 = 4 x IT<br>11 = 8 x IT | R/W [1:0] | 452 |
| PS_SYNC_IT | 00: 50 us<br>01: 100 us<br>10: 200 us<br>11: 400 us | R/W [3:0] PS_SYNC_IT SETTING (P1 IT) | 453 |
| PS_SYNC_IT_BANK | 00 = 1 x IT<br>01 = 2 x IT<br>10 = 4 x IT<br>11 = 8 x IT | R/W [1:0] | 454 |

FIG. 4E

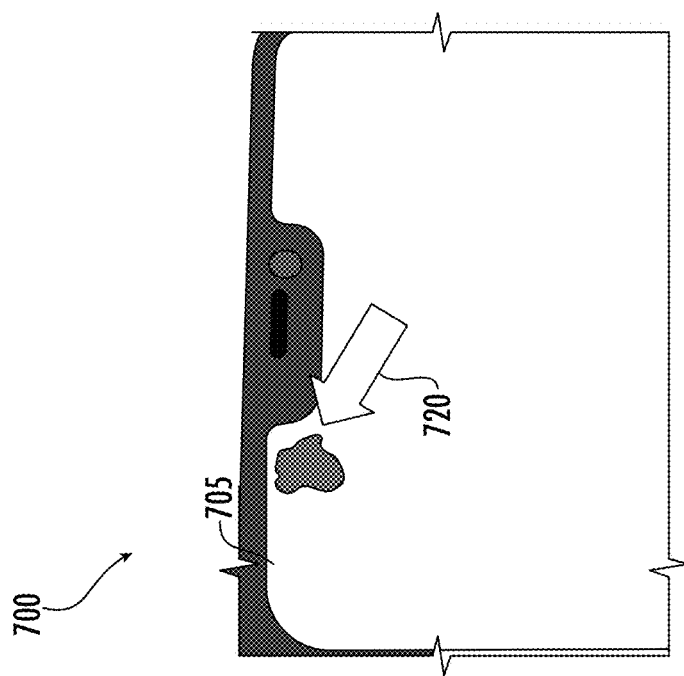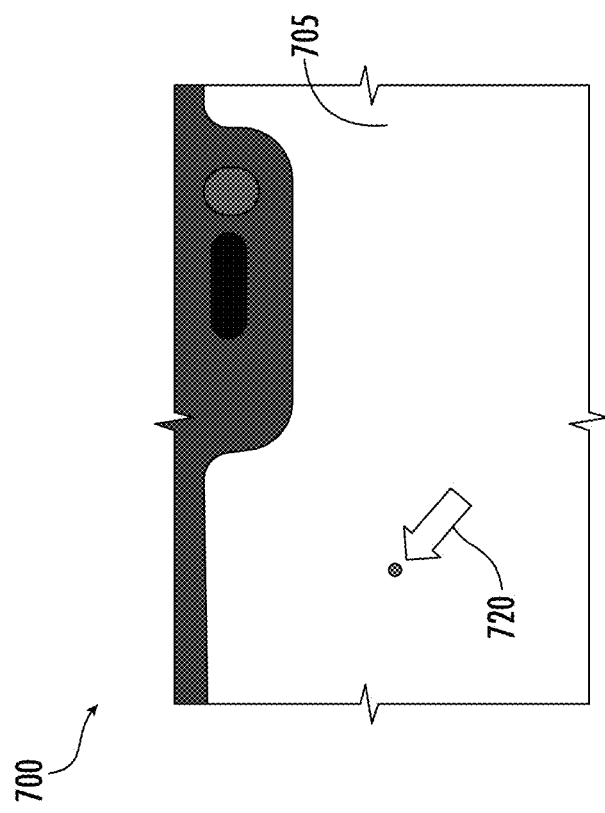
FIG. 7

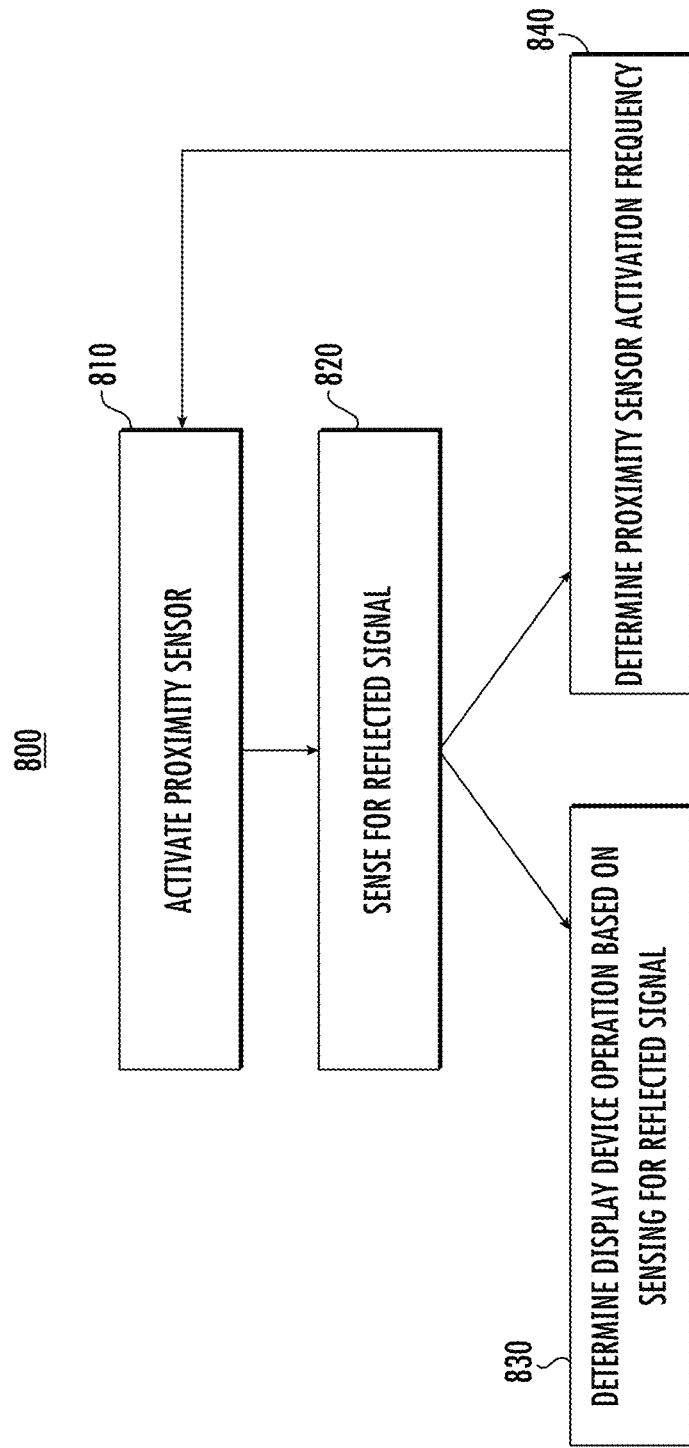

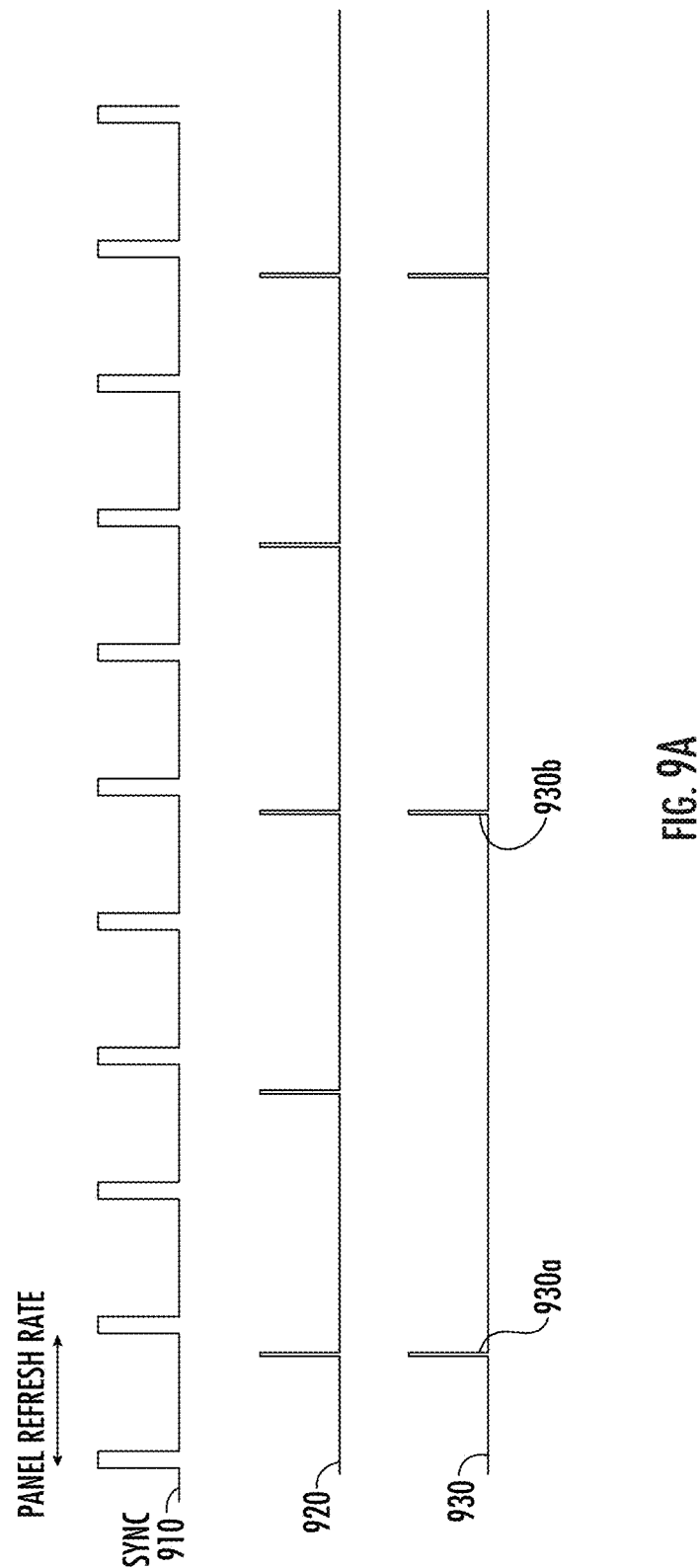

UNDER DISPLAY SENSORS, SYSTEMS AND METHODS

CROSS REFERENCE TO RELATED APPLICATIONS

This application is a division of U.S. patent application Ser. No. 16/860,198, filed Apr. 28, 2020 which claims the benefit of U.S. provisional Application No. 62/906,039, filed Sep. 25, 2019, which are incorporated by reference as if fully set forth.

FIELD OF INVENTION

The present disclosure relates to sensing devices in general, and more particularly, to under display proximity and ambient light sensing methods, systems and devices.

BACKGROUND

Sensing ambient conditions can be an important part of optimizing the operation of electronic devices such as devices that include display screens. Sensing such conditions can inform the operation of such electronic devices so that the electronic devices can operate or be operated more efficiently and cost effectively.

An electronic device that includes a display screen can also include a number of additional components that can facilitate use of sensing ambient conditions to optimize the operation of the electronic device. The placement and configuration of such additional components can improve overall performance of the device and reduce manufacturing costs.

SUMMARY

Techniques, processes, methods, devices, and systems disclosed herein include detecting a vertical synchronization (VSYNC) signal cycle, determining a high frequency trigger pulse based on detecting an illumination component's pulse width modulation (PWM) signal, the high frequency trigger pulse corresponding to the illumination component's deactivation times, receiving a delay time period and activating a first sensor, at a first time, within the VSYNC signal cycle, the first time determined based on the high frequency trigger pulse and the delay time period. The first sensor may sense a first sensor reading and may be deactivated after being activated. A display setting may be adjusted based at least on the first sensor reading and the illumination component may be activated after the first sensor is deactivated. According to an implementation, an updated VSYNC signal cycle may be determined. Further, a determination may be made that the updated VSYNC signal cycle is at least one of greater than a high frequency threshold (HFTH) and less than a low frequency threshold (LFTH) and an updated high frequency trigger pulse and an updated delay time period may be determined accordingly. The first sensor may be activated at a second time within the updated VSYNC signal cycle, the second time determined based on the updated high frequency and the updated delay time period.

According to one aspect, a device disclosed herein includes a surface layer having an upper surface and a lower surface and formed to receive ambient wavelengths, an illumination component positioned under the lower surface of the surface layer and configured to activate and deactivate, and a first sensor positioned under the lower surface of the surface layer such that the illumination component is positioned between the surface layer and the illumination component. The first sensor may be configured to activate when the illumination component is deactivated and sense an ambient wavelength emitted through the surface layer while the first sensor is activated. A processor is provided and may be configured to modify an operation of the illumination component based on the ambient wavelength sensed by the first sensor.

According to another aspect, a process, method or technique is provided and includes transmitting a proximity signal from a proximity sensor in a reflection effect area of a display device when an illumination component within the reflection effect area as the illumination component is deactivated, receiving a reflected proximity signal based on the transmitted proximity signal, determining that the display device is in one of a stable state or a transition state based on the reflected proximity signal and determining a proximity sensor sensing rate based on the whether the display device is determined to be in one of a stable state or a transition state.

According to another aspect, a device disclosed herein includes an illumination component located in a reflection effect area, and a proximity sensor located in the reflection effect area. The proximity sensor may be configured to transmit a proximity signal when the illumination component is deactivated, receive a reflected proximity signal based on the transmitted proximity signal. A processor may be configured to determine that the display device is in one of a stable state or a transition state based on the reflected proximity signal and determine a proximity sensor sensing rate based on the determining that the display device is in one of a stable state or a transition state.

According to another aspect, a display device may be manufactured by placing an illumination component below a surface layer of the display device, and placing a first sensor proximate to the illumination component. The first sensor may be configured to detect a VSYNC signal cycle, determine a high frequency trigger pulse by detecting a PWM signal of the illumination component, the high frequency trigger pulse corresponding to a deactivation time of the illumination component, determine a delay time period and activate at a first time within the VSYNC signal cycle, the first time determined based on the high frequency trigger pulse and the delay time period.

According to another aspect, a display device may be manufactured by placing an illumination component below a surface layer of the display device and placing a processor below the surface layer the display device. The processor may be configured to detect a VSYNC signal cycle, determine a high frequency trigger pulse by detecting a PWM signal of the illumination component, the high frequency trigger pulse corresponding to a deactivation time of the illumination component and to determine a delay time period. A first sensor may be placed proximate to the illumination component and may be configured to activate at a first time within the VSYNC signal cycle, the first time determined based on the high frequency trigger pulse and the delay time period.

According to another aspect, a display device may be manufactured by placing an illumination component in a reflection effect area and placing a proximity sensor in the reflection effect area. The proximity sensor may be configured to transmit a proximity signal when the illumination component is deactivated and receive a reflected signal based on the transmitted proximity signal. A processor may be placed in the display device and may be configured to determine that the display device is in one of a stable state or a transition state based on the reflected signal and determine a proximity sensor sensing rate based on the determining that the display device is in one of a stable state or a transition state.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

FIG. 4A is a diagram illustrating example sensor activation times;

FIG. 4C is a diagram illustrating an example high frequency trigger pulse signal;

FIG. 4E is a chart illustrating activation times based on a delay signal;

FIG. 4I1 is a diagram illustrating an example ASST scheme implementation;

FIG. 7 is an image illustrating an example dark spot on a display;

FIG. 8 is a flowchart for determining display device operation and proximity sensor activation frequency;

FIG. 9A is a diagram of proximity sensor activation times;

DETAILED DESCRIPTION OF THE PREFERRED EMBODIMENT(S)

Figure 1:
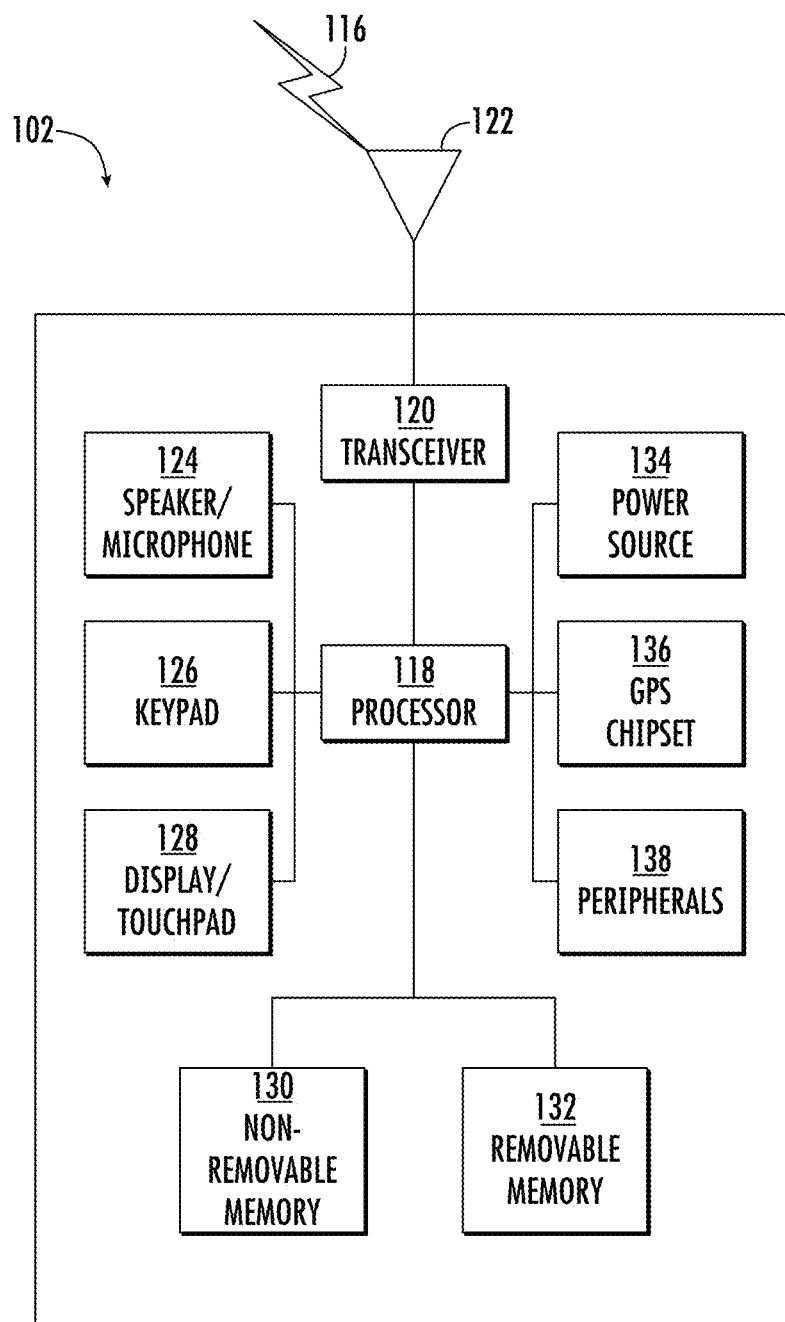
FIG. 1 is a system diagram illustrating an example device with a display.

Embodiments of the present teachings provide techniques, devices, and systems to implement under device sensing using sensors placed below the surface layer of a display device such as a mobile phone. The sensors may be placed below light emitting components of the display device and may be configured to sense ambient light wavelengths and/or proximity detection signals in conjunction with operation of the light emitting components of the display device.

The sensors may be configured to activate while respective light emitting components of a display device are in an off state such that light emitted by the light emitting components that is reflected back into the display device does not interfere with the operation of the sensors. The off state of such light emitting components may be determined by first detecting a Vertical Sync (VSYNC) cycle of the light emitting components which indicates the cycle refresh rate of the light emitting components. A high frequency trigger pulse rate may be determined based on the VSYNC cycle and a pulse width modulation rate of the light emitting components. The high frequency trigger pulse rate may provide a trigger pulse to one or more sensors, based on the on and off times of the light emitting components within a given VSYNC cycle. A delay time may also be determined based on the physical location of the light emitting components and may be applied to the VSYNC cycle to align the high frequency trigger pulse rate for each sensor or group of sensors. The delay adjusted high frequency trigger pulse rate may provide the trigger pulse to a sensor or group of sensors such that the sensor or group of sensors is activated at times when the corresponding light emitting components are deactivated.

According to an embodiment of the present teachings, proximity sensors may be activated during off times of corresponding light emitting components to prevent or mitigate visible dark spots on a display device. Further, the frequency of activation of the proximity sensors may be determined based on whether a given display device is in a stable state or an transition state. The stable state and transition states may be determined based on the proximity of the display device to an external object external to the display device.

It will be understood that, although the terms first, second, and the like may be used herein to describe various elements, these elements should not be limited by these terms. These terms are only used to distinguish one element from another. For example, a first element could be termed a second element, and, similarly, a second element could be termed a first element, without departing from the scope of the present teachings. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

FIG. 1 is a system diagram illustrating an example device 102 which may, for example, he a smartphone that includes a display which also functions as a touch screen. As shown in FIG. 1, the device 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the device 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the device 102 to operate in a wireless environment. The processor 118 may be coupled to the transceiver 120, which may be coupled to the transmit/receive element 122. While FIG. 1 depicts the processor 118 and the transceiver 120 as separate components, it will be appreciated that the processor 118 and the transceiver 120 may be integrated together in an electronic package or chip. Further, although FIG. 1 shows a single processor 118, multiple processors may be provided to implement the subject matter of the present teachings.

The transmit/receive element 122 may be configured to transmit signals to, or receive signals from, a base station over the air interface 116. Although the transmit/receive element 122 is depicted in FIG. 1 as a single element, the device 102 may include any number of transmit/receive elements 122.

The processor 118 of the device 102 may be coupled to, and may receive user input data from, the speaker/microphone 124, the keypad 126, and/or the display/touchpad 128 (e.g., a liquid crystal display (LCD) display unit or organic light-emitting diode (OLED) display unit) The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the device 102, such as on a server, PC or a home computer.

The processor 118 may receive power from the power source 134, and may be configured to distribute and/or control the power to the other components in the device 102. The power source 134 may be any suitable device for powering the device 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like, or any known power supply for such a purpose.

The processor 118 may also be coupled to the GPS chipset 136, which may be configured to provide location information (e.g., longitude and latitude) regarding the current location of the device 102. In addition to, or in lieu of, the information from the GPS chipset 136, the device 102 may receive location information over the air interface 116 from a base station and/or determine its location based on the timing of the signals being received from two or more nearby base stations.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

Having described the present teachings in detail, those skilled in the art will appreciate that, given the present disclosure, modifications may be made to the present teachings without departing from the spirit of the concepts described herein. Therefore, it is not intended that the scope of the present teachings be limited to the specific embodiments illustrated and described.

Figure 2A:
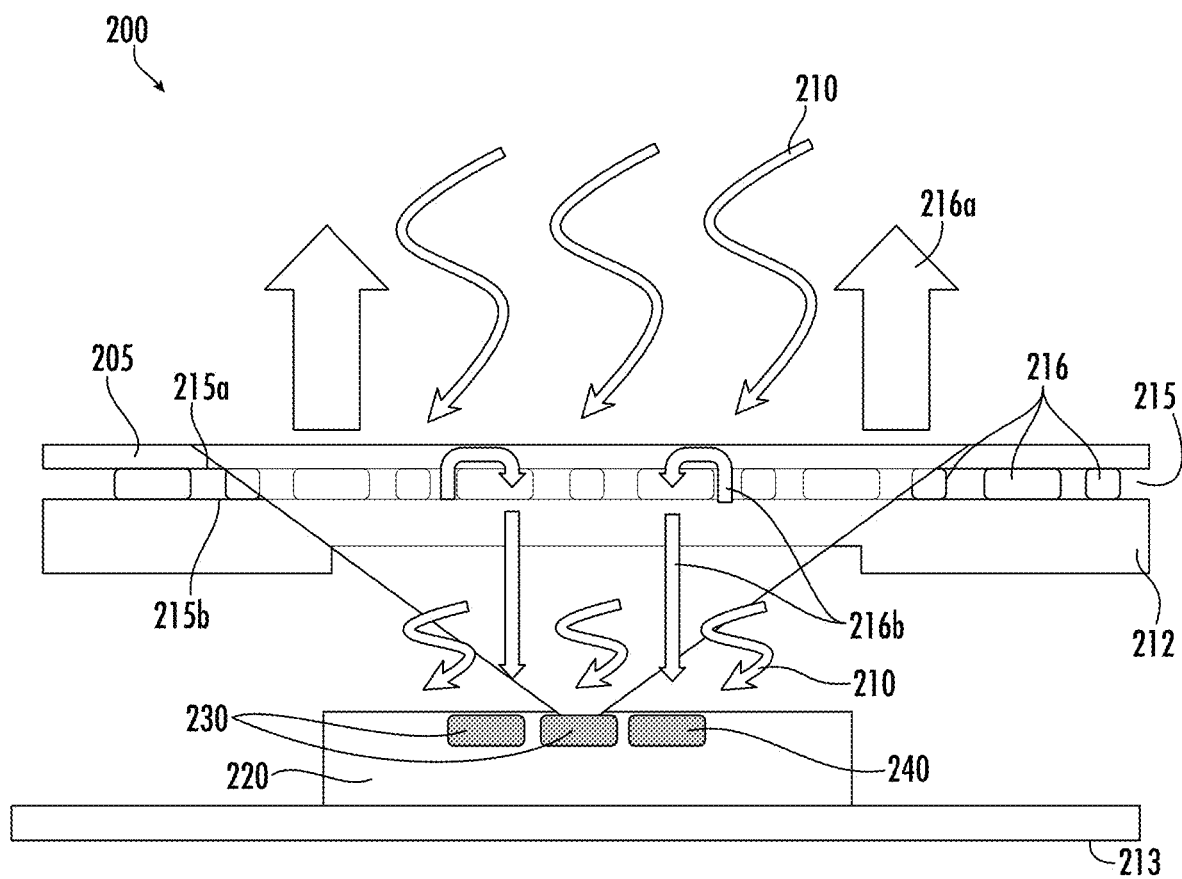
FIG. 2A is a cross-sectional diagram illustrating example display and sensors in a device.

According to embodiments of the present teachings, techniques and devices for determining under display sensing timing schemes and smart proximity sensing are provided. FIG. 2A shows a diagram of a display device 200 including a surface layer 205 formed to allow ambient light wavelengths 210 into the display device 200. The display device may be the same as or similar to the device 102 of FIG. 1. The display device 200 may be any device configured to display and/or otherwise provide visible light via the surface layer 205 and may be, for example, a mobile device, a laptop screen, a monitor, a gamming device screen, a medical device screen, or the like. The surface layer 205 may be a fully or partially transparent layer such that light wavelengths are able to enter and exit the surface layer 205 from both primary surfaces of the surface layer 205.

The display device 200 may include a light emitting layer 215 which may include a plurality of illumination components 216 configured to emit light. The illumination components 216 may be Light Emitting Diodes (LEDs), Active-Matrix Organic Light-Emitting Diodes (AMOLEDs), organic light-emitting diode (OLEDs), or the like. As an example, the illumination components 216 may include components that emit a different wavelength or range of wavelengths such as those corresponding to red, green, and blue visible light. The light emitting layer 215 including the illumination components 216 may be positioned below the surface layer 205 within the display device 200. A transistor layer 212 may be provided and may be positioned below the light emitting layer 215 such that the surface layer 205 faces a first surface 215a of the light emitting layer 215 and the transistor layer 212 faces a second surface 215b of the light emitting layer 215, such that the first surface 215a is substantially opposite the second surface 215b.

Shown in FIG. 2A, the illumination components 216 may produce both emitted light 216a and internal light 216b. Emitted light 216a may be light produced by illumination components 216 that exits the display device 200 via surface layer 205. Emitted light 216a may be the light that is produced by illumination components 216 to facilitate the intended operation of the display device 200. Internal light 216b may be light that is produced by illumination components 216 and is reflected or otherwise directed back into display device 200. For example, internal light 216b may be light that is emitted by the illumination components 216 and is reflected by the surface layer 205 and emitted back into the display device 200. Internal light 216b may be light that is not provided to facilitate intended operation of the device and may be a byproduct of the properties of the light and components of display device 200. Notably, the display device 200 may be arranged such that all or part of the internal light 216b can be incident upon the one or more sensors in the sensor layer 220, such as light sensors 230 and/or proximity sensors 240, as further disclosed herein. As applied herein, a light sensor may be an Ambient Light Sensor (ALS), or a similarly functioning sensor known to those in the art.

The transistor layer 212 may include electrical contacts configured to independently control the illumination components 216. As an example, the transistor layer 212 may include a plurality of thin-film transistors (TFTs) which are types of metal-oxide-semiconductor field-effect transistors MOSFETs. The TFTs may be manufactured by depositing thin films of an active semiconductor layer as well as a dielectric layer and metallic contacts over a supporting substrate. The TFT layer may be translucent such that light may pass through the TFT layer and may experience attenuation as it emitted through the TFT layer. According to an example, the light transmission may be in the range of 5% to 40% due to light attenuation through the TFT layer.

The display device 200 may also include a sensor layer 220 which may include one or more sensors such as light sensors 230 and/or proximity sensors 240, or a combination of those. According to an embodiment, as shown in FIG. 2A, The sensor layer 220 may be positioned below the transistor layer 212 such that the one or more sensors (e.g., light sensors 230 and/or proximity sensors 240) face the transistor layer 212 and are located on the opposite side of the transistor layer 212 than the light emitting layer 215. Accordingly, the transistor layer 212 may be positioned between the sensor layer 220 and the light emitting layer 215. According to another embodiment, the sensor layer 220 may face or otherwise be positioned to detect or sense light emitted from the light emitting layer 215 without a transistor layer 212 being positioned between the light emitting layer 215 and the sensor layer 220. The transistors in the transistor layer 212 may be positioned above one or more sensors in the sensor layer 220 or may be offset from the sensors in the sensor layer 220 such that the transistors in the transistor layer 212 are fully or partially offset from the location of the one or more sensors in the sensor layer 220.

The sensor layer 220 may include one or more different types of sensors, such as light sensors 230 and proximity sensors 240 such that the different types of sensors are positioned on different planes relative to each other. The sensor layer 220 may be located proximate to or over a printed circuit board 213.

The ambient light wavelengths 210 may be any light wavelengths that are generated or otherwise provided external to the display device 200 and that enter the display device 200 via the surface layer 205. The ambient light wavelengths 210 may correspond to natural light, external illumination device generated light, externally reflected light, or the like, and may be a light that is a combination of light from two or more sources. Notably, the display device 200 may be arranged such that ambient light wavelengths 210 incident up on the display device 200 can enter the display device 200 via the surface layer 205 and can be incident upon the one or more sensors in the sensor layer 220, such as light sensors 230 and proximity sensors 240.

Light sensors 230 in, or in any way a part of, the sensor layer 220 may be configured to receive ambient light wavelengths 210 to determine one or more ambient lighting conditions corresponding to the display device 200. The light sensors 230 may receive light wavelengths incident upon the light sensors 230 and may determine one or more properties of the ambient lighting conditions. Such properties may include brightness (LUX), hue, saturation, correlated color temperature (CCT), tristimulus values (XYZ or xy), or the like. The light sensors 230 may sense such one or more properties and generate electric signals that enable a processor or other component(s) to modify operation of the display device 200 such as by modifying the operation of the illumination components 216. The processor and/or other component(s) may be configured to operate alone or in conjunction with software, operating system, or the like. Notably, the teachings disclosed herein, including those related to FIGS. 2A and 2B may be performed by single components, by a combination of components, and/or by a combination of hardware, software, and/or firmware.

For example, the light sensors 230 may generate electrical signals that result in a processor determining that that the ambient light incident upon light sensors 230 has a brightness value lower than a predetermined threshold and, accordingly, the processor may provide an electrical signal to facilitate reduction of the overall brightness level of light emitted via illumination components 216.

Proximity sensors 240 in the sensor layer 220 may be configured to detect the proximity of an external object (e.g., the ear of a mobile device user), the external object being external to the display device 200. The proximity sensors 240 may operate by transmitting a signal at a first wavelength and sensing a response to the signal as it is reflected or directed back onto the proximity sensors 240. The signal may be, for example, an infra-red (IR) signal that is transmitted by one or more proximity sensors 240 such that the timing, amplitude, and/or phase of the response signal that is received as a result of the transmission is sensed by one or more of the proximity sensors 240. The proximity sensors 240 may sense the response signal and generate electric signals that enable a processor to modify operation of the display device 200 such as by modifying the operation of the illumination components 216. For example, the proximity sensors 240 may generate electrical signals that result in a processor determining that a user's ear is within a threshold distance of the display device 200 based on the return signal received by the proximity sensors 240. Accordingly, the processor may provide an electrical signal to facilitate operation of the illumination components 216, such as, by reducing the output of the illumination components 216 while the display device is at the user's ear.

As shown in FIG. 2A, both the ambient light wavelengths 210 and the internal light 216b may be incident upon the one or more sensors in the sensor layer 220. The ambient light wavelengths 210 may pass through the surface layer 205 and traverse the display device 200 such that it reaches the one or more sensors in the sensor layer 220 including, for example, light sensors 230 and proximity sensors 240. The internal light 216b may be or may include portions of the light emitted from the illumination components 216 that is reflected back into the display device 200 by the surface layer 205 or is otherwise directed back into the display device 200. The internal light 216b may reach the one or more sensors in the sensor layer 220 including, for example, light sensors 230 and proximity sensors 240.

As can be appreciated, light sensors 230 and/or proximity sensors 240 may be configured to detect ambient conditions that are external to the display device 200. For example, the light sensors 230 may detect ambient light that is incident upon the display device 200 and the proximity sensors 240 may detect the proximity of an external object to the display device 200. However, operation of the light sensors 230 and the proximity sensors 240 may produce inaccurate results due to the internal light 216b being incident upon the light sensors 230 and/or proximity sensors 240. Notably, while the light sensors 230 are activated to sense the ambient light wavelengths 210, such sensing may produce inaccurate, unintended, or unwanted results when, in addition to the ambient light wavelengths 210, the light sensors 230 also sense internal light 216b. To clarify, such sensing may produce inaccurate results when detecting ambient conditions because the light sensors 230 sense both the ambient light wavelengths 210 and the internal light 216b.

Similarly, proximity sensors 240 may emit a signal (e.g., IR signal) at a given wavelength and may sense the response signal that is reflected off an object external to the display device 200. The proximity sensor 240 may sense one or more properties of the response signal (e.g., timing, amplitude, phase, etc.) to determine the proximity of the external object. However, the proximity sensors 240 may produce inaccurate results due to the internal light 216b being incident upon the proximity sensors 240 in addition the response signals incident upon the proximity sensors 240.

Figure 2B:
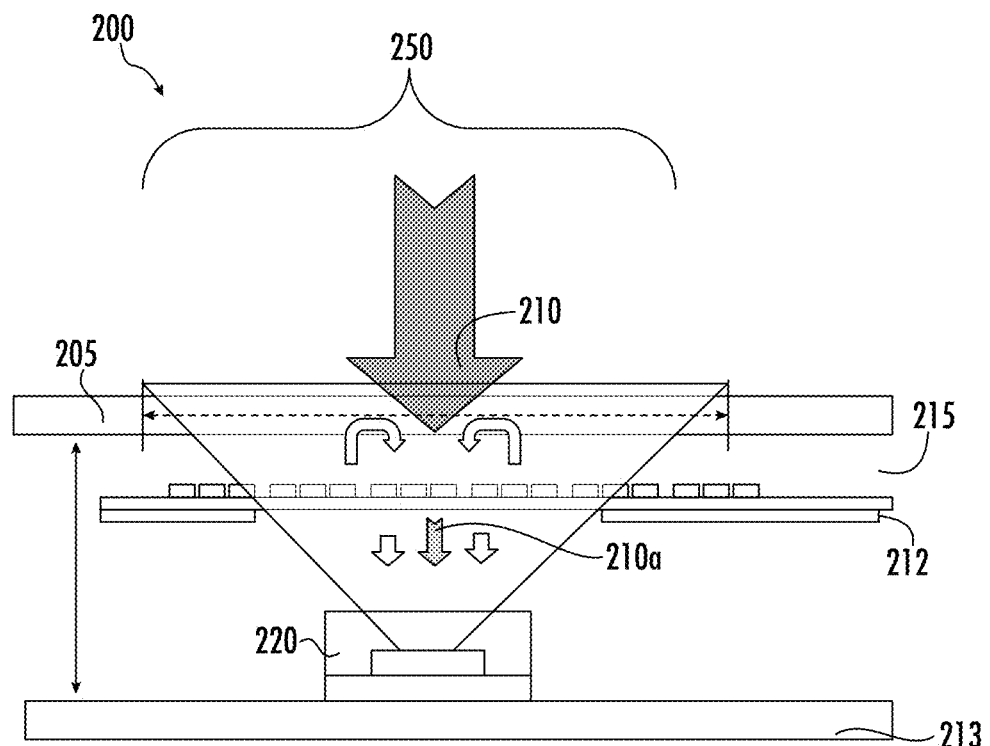
FIG. 2B is a cross-sectional diagram including a reflection effect area of a device.
Figure 2C:
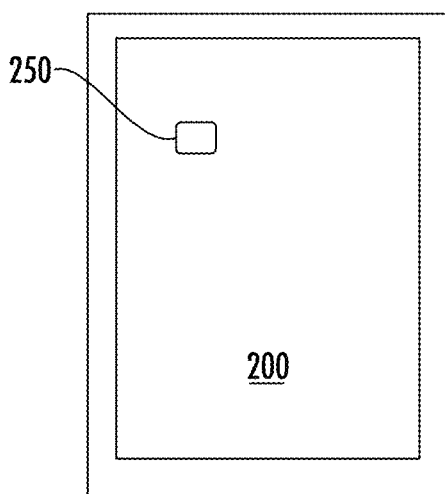
FIG. 2C is a top view diagram including a reflection effect area of a device.
Figure 2D:
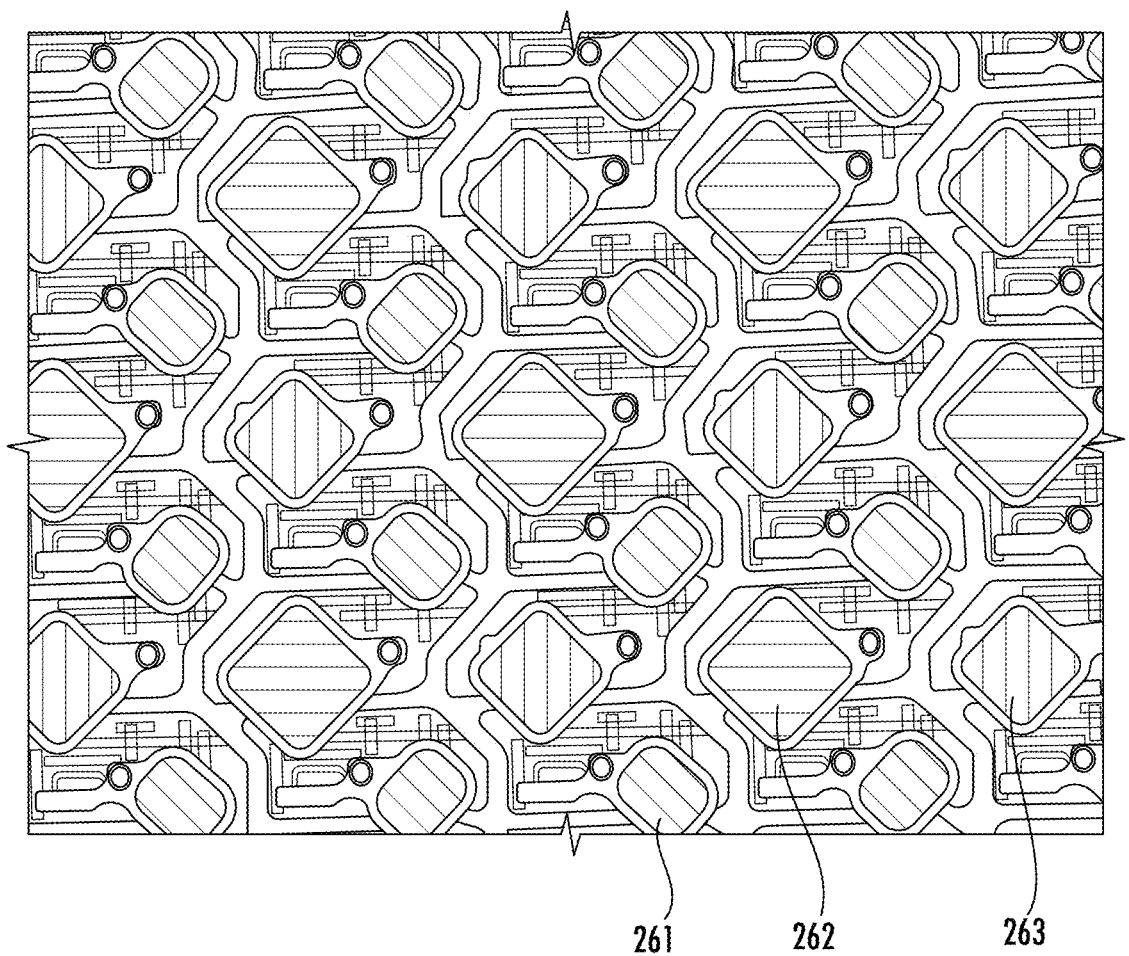
FIG. 2D is a top view of illumination components in a display device.

FIG. 2B shows a different perspective of the display device 200 shown in FIG. 2A. As shown in FIG. 2B, a reflection effect area 250 corresponds to a portion of the surface layer that may reflect light either emitted from the light emitting layer 215 towards the sensor layer 220. To clarify, a portion of the surface layer 205 indicated by the reflection effect area 250 may be the portion of the surface layer 205 that can reflect light onto one or more sensors in the sensor layer 220. As shown in FIG. 2B, the ambient light wavelengths 210 may be incident upon the surface layer 205 and attenuated ambient light wavelengths 210a which are an attenuated version of the ambient light wavelengths 210, may be incident upon one or more sensors in the sensor layer 220. FIG. 2C shows a top view of the display device 200 which includes a top view of the reflection effect area 250 that is also shown in FIG. 2B. FIG. 2D shows a top view of illumination components such as illumination components 216 of FIG. 2A. The illumination components shown in FIG. 2D may be part of a light emitting layer such as light emitting layer 215. As shown in FIG. 2D, a light emitting layer may include different illumination components such as green illumination component 261, blue illumination component 262, and red illumination component 263. Each different illumination component may be configured to emit light at different wavelengths and may, for example, have wavelength converting material (e.g., phosphor) that is part of each illumination component.

The components shown in FIGS. 2A and 2B are shown to be arranged in an example arrangement. It will be understood that a modified arrangement of such components may be provided in accordance with the subject matter of this disclosure. For example, the surface layer 205 may be the top most layer of a display device and the light emitting layer 215, transistor layer 212, and sensor layer 220 may be below, adjacent to, facing, or otherwise proximate to the surface layer 205.

Figure 13:
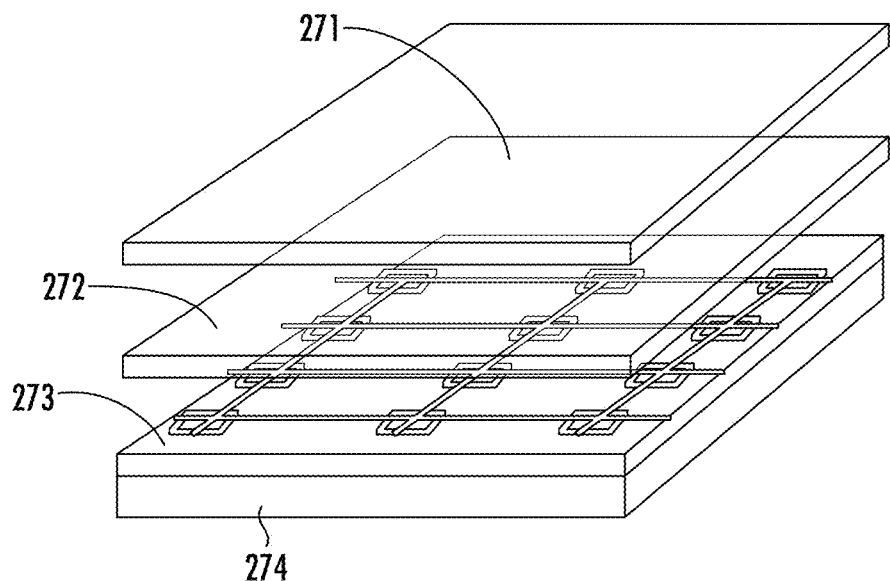
FIG. 13 diagram of an active-matrix OLED display.

FIG. 13 shows multiple layers of an example display device in accordance with embodiments of the disclosed subject matter. The example provided in FIG. 13 may correspond to an active matrix OILED with a TFT layer under the matrix. As shown, FIG. 13 includes a cathode layer 271, an organic active layer 272, a TFT layer 273, and a substrate layer 274. The TFT layer 273 may include a plurality of TFTs that are configured to independently address illumination components provided in the organic active layer 272. The TFTs in the TFT layer 273 may receive signals from one or more processor and may activate corresponding illumination components based on the signals received from the one or more processors.

Figure 14:
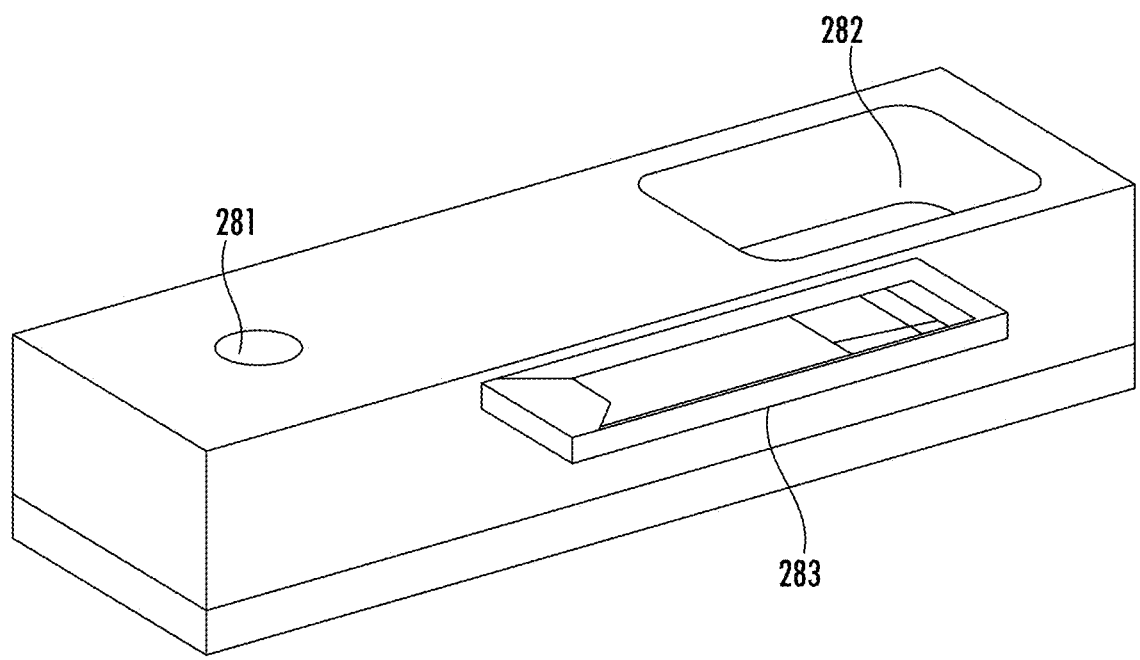
FIG. 14 is a diagram of a sensor package with an emitter and a sensor.
Figure 15:
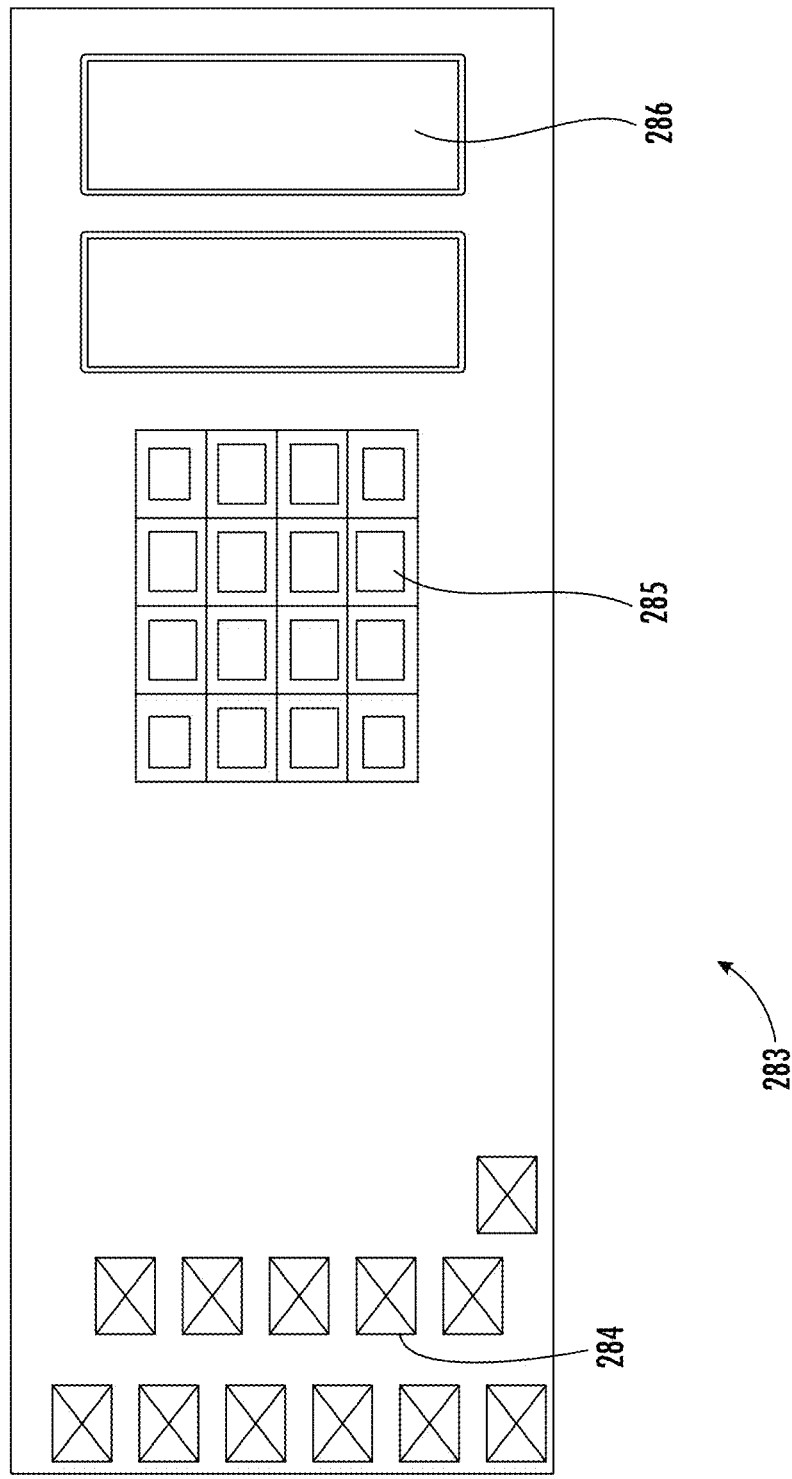
FIG. 15 is a diagram of a sensor pad.

FIGS. 14 and 15 show an example sensor package 280 which includes an emitter window 281, sensor window 282, and a sensor pad 283. The emitter window 281 may include or may be located above an IR emitter (e.g., 940 nm IR emitter) configured to emit a sensor signal through the emitter window 281. The sensor window 282 may be configured to receive a signal received as a result of the signal transmitted via sensor window 282.

FIG. 15 shows a detailed view of the sensor pad 283 which includes, for example, RGB light sensors 285, proximity sensors 286 and bond pads 284. The RGB light sensors 285 and proximity sensors 286 may activate in accordance with the techniques disclosed herein and may be activated independent of each other such that the RGB light sensors 285 are activated at the same time or at different times than the proximity sensors 286.

According to embodiments of the present teachings, an under display sensing scheme includes one or more sensors that activate when illumination components (e.g., illumination components 216 of FIG. 2A) are in an off-state. With reference to FIG. 2A, this under display sensing scheme allows for one or more sensors in a sensor layer 220 to be placed underneath the surface layer 205 of a display device 200 such that the unwanted effects of internal light 216b is mitigated or illuminated. The one or more sensors in sensor layer 220 may be placed underneath the surface layer 205 such that the one or more sensors are on a plane that is below the plane created by the surface layer 205. Notably, the techniques disclosed herein enable operation of one or more sensors in the sensor layer 220 while illumination components 216 are effectively turned off such that no or minimal internal light 216b is present while the one or more sensors are in operation.

Figure 3:
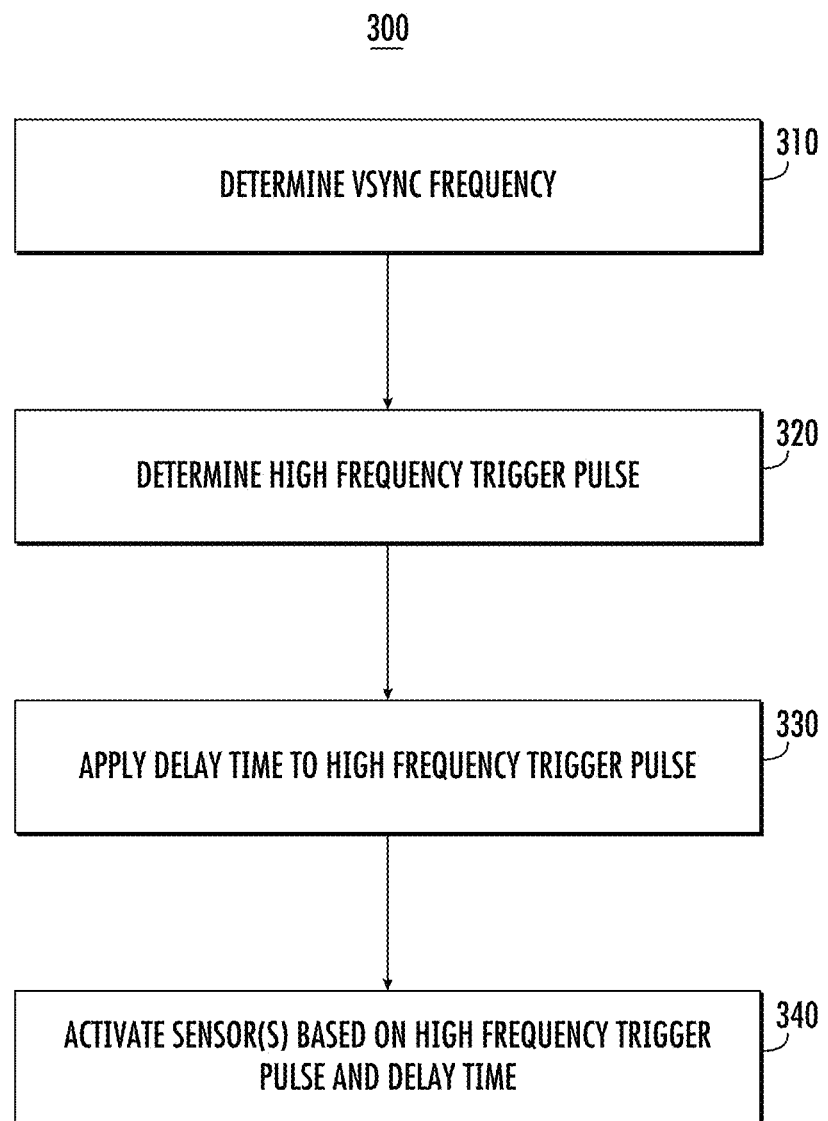
FIG. 3 is a flowchart for activating sensors based on a high frequency trigger pulse and delay time.

FIG. 3 shows a process 300 for activating under display sensors based on embodiments disclosed herein. Although described with respect to the system of FIGS. 2A, 2B, 4A, 4B, 4C, 4D, and 4E, those of skill in the art will recognize that any system, configured to perform the steps of process 300 in any technically feasible order, falls within the scope of the present disclosure At step 310 of process 300 of FIG. 3, a Vertical Sync (VSYNC) frequency that indicates the display refresh timing for a display device 200 is detected. The VSYNC frequency may be detected based on receiving a signal from one or more timing controllers (TCONs) of the light emitting layer 215 shown in FIG. 2. The VSYNC frequency may include a rising edge and a falling edge and the time duration between a first VSYNC cycle edge (e.g., rising edge or falling edge) and a second VSYNC cycle edge may correspond to the cycle length of the refresh timing for a display device 200. A VSYNC frequency may be any applicable frequency that enables operation of a display device and may be, for example, 60 Hz, 90 Hz, 120 Hz, 240 Hz, or the like. The VSYNC signal provided by a TCON may be the input to a sync pin of one or more sensors of sensor layer 220.

FIG. 4A shows a diagram that illustrates the process 300. As shown in FIG. 4A, a VSYNC signal 410 may be detected and may have a cycle length 411 corresponding to the VSYNC signal 410 frequency. According to this example, the VSYNC signal 410 may have a frequency of 60 Hz such that the cycle length of each VSYNC signal is .about.16.66 ms. The VSYNC signal frequency and/or cycle length may be provided by a TCON for light emitting layer including illumination components (e.g., AMOLED, LED, OLED, etc.). The VSYNC signal 410 cycle length 411 may be measured from a first leading edge to a second leading edge or, alternatively, from a first falling edge to a second falling edge of the VSYNC signal 410. The one or more sensors in sensor layer 220 may operate using a driver that is configured to read a sync cycle detector counter value and may determine a VSYNC signal 410.

Figure 4B:
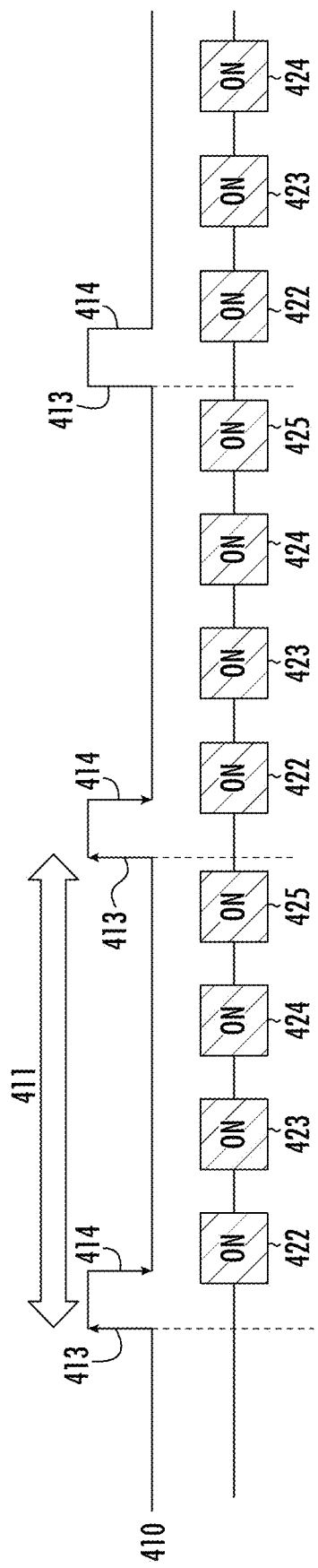
FIG. 4B is a diagram illustrating an example VSYNC signal.

FIG. 49 shows a simplified portion of the FIG. 4A and includes the VSYNC signal 410 with cycle length 411. The VSYNC signal 410 may be detected when a corresponding VSYNC detect mode register is set to an enable bit 01. The VSYNC signal 410 may be detected using a base clock set at, for example, 1 MHz. A rising edge 413 may be detected and stored as a rising edge 0 bit at a SYNC_EDGE register corresponding to a sync signal edge setting. A falling edge 414 may be detected and stored as a falling edge 1 bit at the SYNC EDGE register. A frequency detect data register may include 16 bits and may store the VSYNC signal data as further disclosed herein. As shown in FIG. 4B, an illumination component may be activated one or more (e.g., 4 times in the specific example of FIG. 4B, corresponding to times 422, 423, 424, and 425 as further disclosed herein) within a VSYNC signal 410 cycle length 411.

At step 320 of process 300 of FIG. 3, a high frequency trigger pulse may be determined. The high frequency trigger pulse may be based on the determination of the VSYNC cycle and may be a high frequency pulse or digital signal that is provided to the one or more sensors in the sensor layer 220 of FIG. 2. The high frequency trigger pulse may be determined by identifying the pulse width modulation (PWM) driving signal frequency (e.g., 240 Hz) that is generated based on the number of cycles that illumination components fluctuate between an on and off state within a given VSYNC cycle. The high frequency trigger pulse may be automatically determined or may be predetermined and may be used to determine the sampling rate for one or more sensors of the sensor layer 220.

FIG. 4A shows an example high frequency trigger pulse 420 described in step 320 of process 300. The high frequency trigger pulse 420 has a cycle length 421. Notably, the cycle length of the high frequency trigger pulse 420 may be, at most, the same as the cycle length 411 of the VSYNC signal 410 because the illumination components (e.g., illumination components 216) can be configured to activate at least one time within each VSYNC signal 410 cycle length 421. As shown in the example of FIG. 4A, the cycle length 421 of the high frequency trigger pulse 420 is .about.4.15 ms and the frequency of the high frequency trigger pulse 420 is 240 Hz and corresponds to a PWM frequency (as further described in FIGS. 6A and 6B) of the illumination component(s) based on which the VSYNC signal 410 is determined. Notably, in this example, the cycle length 421 of the high frequency trigger pulse 420 is one fourth of the cycle length 411 of the VSYNC signal 410 as the PWM driving signal frequency for the corresponding illumination components would indicate that such components are activated four times within a given VSYNC signal 410 cycle. As shown in FIG. 4A, an illumination component may activate at times 422, 423, 424, and 425 which correspond to a frequency that is equivalent to the frequency of the high frequency trigger pulse 420. The high frequency trigger pulse 420 determination may be stored in a high frequency trigger setting register and may be provided to one or more sensors to determine sensor activation times. As an example, if the high frequency trigger pulse 420 corresponds to a 240 Hz frequency, then the high frequency trigger setting register may store '4116' corresponding to a cycle length of 4.166 ms. According to this example, a sensor or group of sensors may trigger based on the high frequency trigger pulse 420 of 4.166 ms resulting in 4 sampling cycles per 60 Hz VSYNC refresh cycle time 411. As another example, if the high frequency trigger pulse 420 corresponds to a 120 Hz frequency, then the then the high frequency trigger setting register may store '8332' corresponding to a cycle length of 8.332 ms. According to this example, a sensor or group of sensors may trigger based on the high frequency trigger pulse 420 of 8.332 ms resulting in 2 sampling cycles per 60 Hz VSYNC refresh cycle time 411.

FIG. 4C shows a simplified portion of the FIG. 4A and includes the VSYNC signal 410 with cycle length 411 and high frequency trigger pulse 420 with a cycle length 421. As disclosed herein, the high frequency trigger pulse 420 with a cycle length 421 may be determined based on detecting a PWM corresponding to the activation and deactivation times of an illumination component (e.g., illumination components 216 of FIG. 2A), as further described in FIGS. 6A and 6B. As shown, the high frequency trigger pulse 420 cycle length 421 may have a duration that is a subset of the VSYNC signal 410 cycle length 411 as an illumination component can have at least one activation and deactivation cycle within each VSYNC signal 410 cycle length 411, as indicated by a corresponding illumination component PWM signal.

Figure 5A:
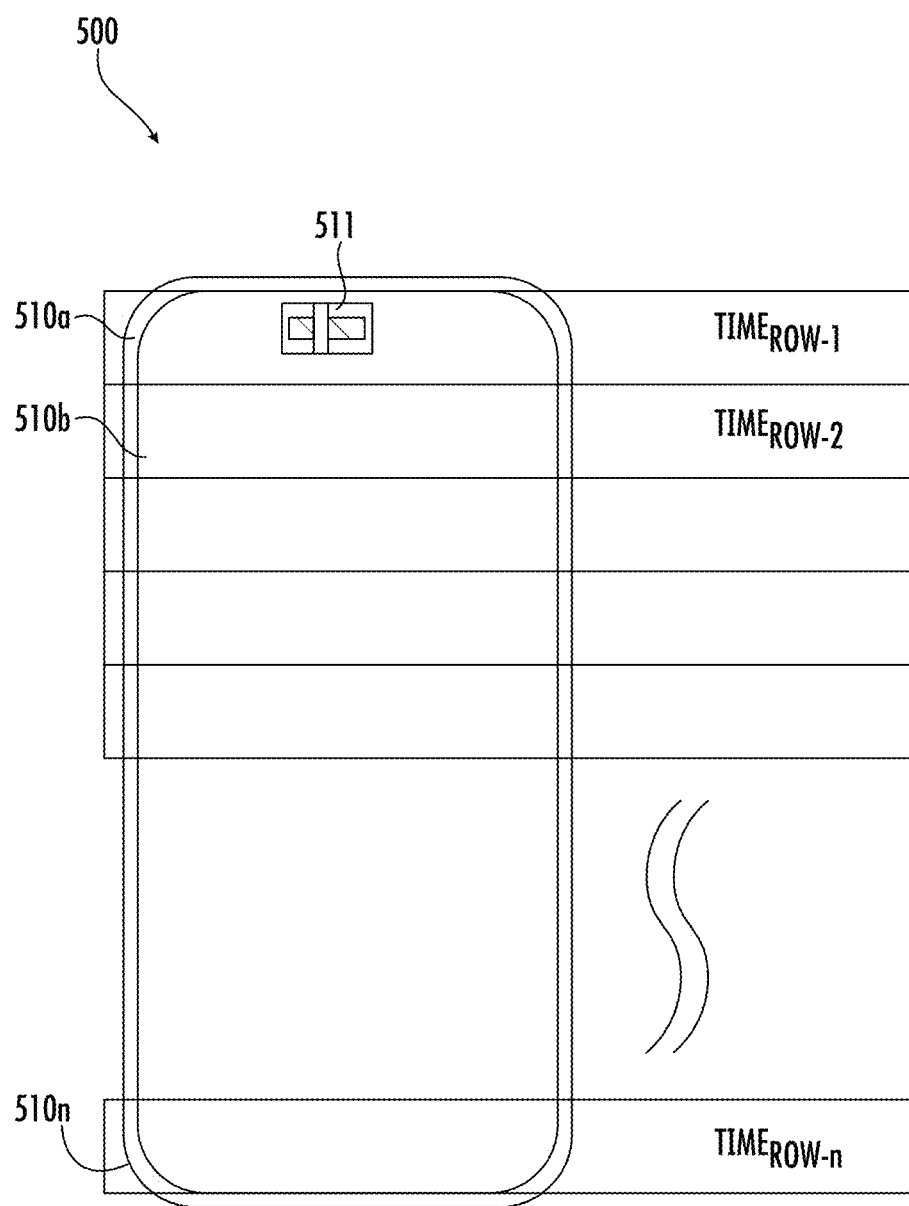
FIG. 5A is a diagram illustrating portions of a display device.
Figure 5B:
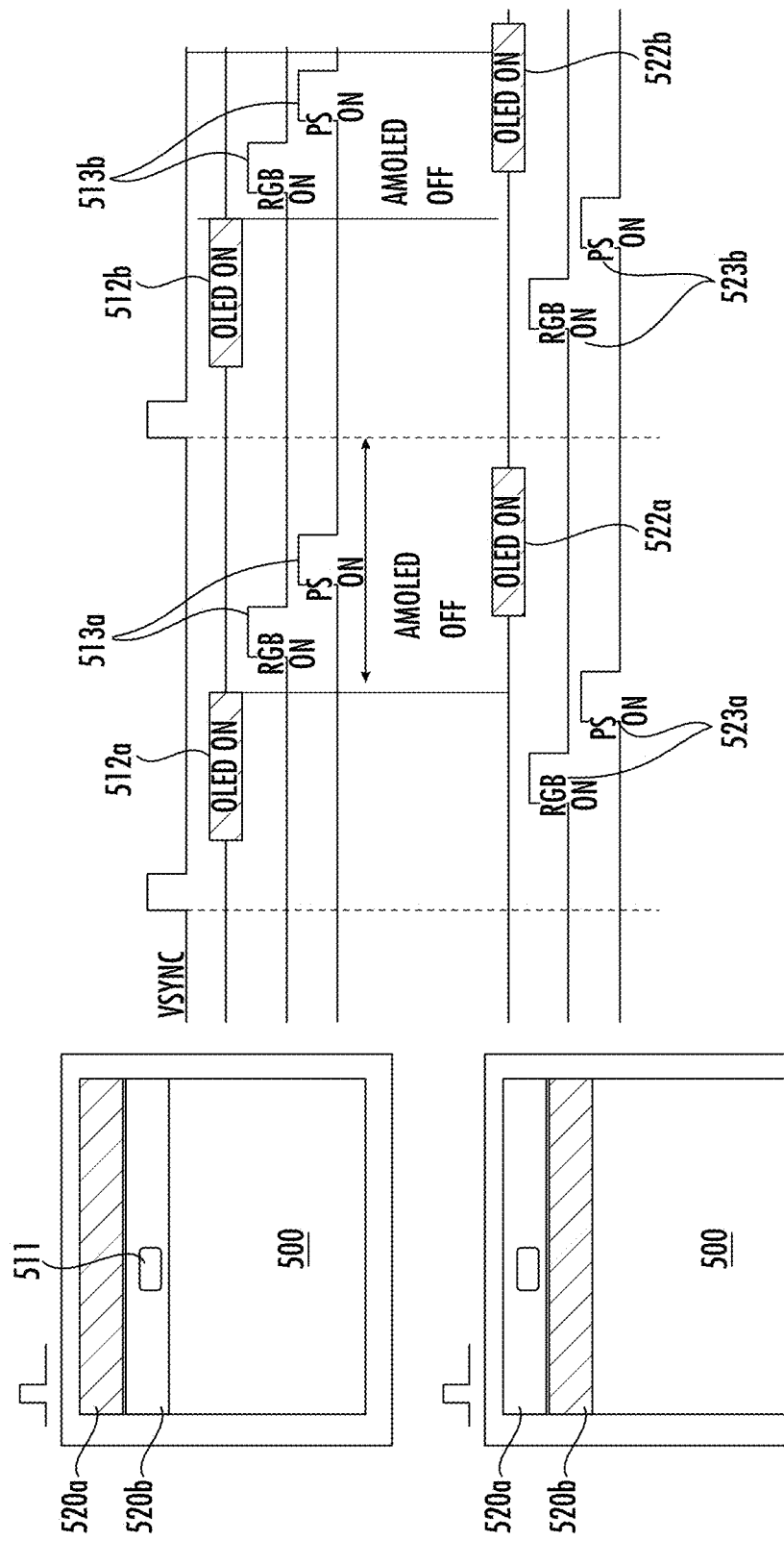
FIG. 5B is a diagram illustrating active portions of a display device.

At step 330 of process 300 of FIG. 3, a delay time is applied to the high frequency trigger pulse of step 320. The delay time may correspond to the location of one or more sensors of a sensor layer, such as sensor layer 220 of FIG. 2. Notably, the sensor layer 220 may include a plurality of sensors and the sensors may be placed at different locations under a light emitting layer 215. The delay time for a given sensor or group of sensors may be determined based on the location, positioning, and/or orientation of the sensor or group of sensors. The value of the delay time may be based on the VSYNC signal and, more specifically, based on the amount of propagation time it takes for the VSYNC signal to reach the location of one or more sensors. FIG. 5A and FIG. 5B show examples of delay times. As shown in FIG. 5A, a display on the display device 500 may be segmented into a plurality of rows 501*a*, 501*b*, through 501*n* such that the delay time may be based on row times Time.sub.row-1, Time.sub.row-2, through Time.sub.row-n, for each given row. For example, a display pixel driver corresponding to the display of display device 500 may be subdivided into four or five blocks of gate on array (GOA) driver circuits. Each GOA driver may drive a specific section of a pixel line. For example, the display device 500 may include GOA blocks for the HD OLED display of 2435 pixel lines. As shown in FIG. 5B, each GOA driver circuit, 520*a* and 520*b*, may drive 487 pixel lines. Each pixel line may have a delay time of 8.55 us. According to some GOA implementations, the sensor location 511 may be placed at a location such that the corresponding pixel line is off during the ending part of the VSYNC cycle as shown by RGB sensor on and PS sensor on times 513*a* and 513*b* that are on towards the end of the corresponding VSYNC cycle while the OLED on times 512*a* and 512*b* are towards the beginning of the corresponding VSYNC cycle, Alternatively, for example, the pixel line is off during the beginning part of the VSYNC cycle as shown by RGB on and PS sensor on times 523*a* and 523*b* that are on towards the beginning of the corresponding VSYNC cycle while the OLED on times 522*a* and 522*b* are towards the beginning of the corresponding VSYNC cycle. The delay time may be determined during an initial setup stage and may be provided based on location of each sensor or group of sensors. Notably, the delay time may be different for each sensor or group of sensors. The delay time may be less than the cycle length 421 of the high frequency trigger pulse 420.

FIG. 4A shows an example delay time 431 determined based on the location of the sensor that is activated at times 432, 433, and 434. Notably, application of the delay time 431 may enable the sensor activation times 432, 433, and 434 to correspond to times between the illumination component active times 422, 423, 424, and 425 such that the sensor that is activated at 432, 433, and 434 is not active while the illumination component is active. When an illumination component is activated at times 422, 423, 424, and 425, the light wavelengths produced by the illumination component result in internal light, such as internal light 216*b* of FIG. 2A. Accordingly, activating a sensor or group of sensors at sensor activation times 432, 433, and 434 avoids the sensor or group of sensors from sensing light wavelengths that include such internal light that is produced during times 422, 423, 424, and 425. A delay time 431 may be stored in a sensor delay time register and a sensor or group of sensors may access the sensor delay time register to determine sensor activation times.

Figure 4D:
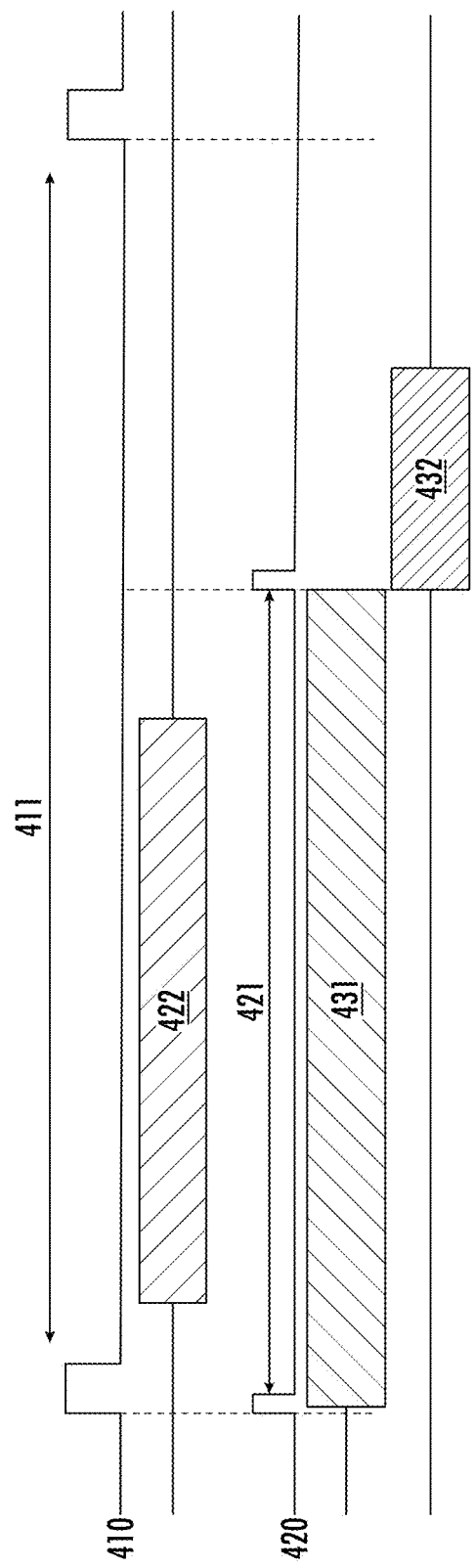
FIG. 4D is a diagram illustrating an example delay signal.

FIG. 4D shows a simplified portion of the FIG. 4A and includes the VSYNC signal 410 with cycle length 411, high frequency trigger pulse 420 with a cycle length 421, illumination component activation time 422, delay time 431, and sensor activation time 432. As shown, a delay time 431 may be determined based on the location of a sensor that is activated at time 432 based on the high frequency trigger pulse 420 with a cycle length 421 that is determined based on a VSYNC signal 410 with cycle length 411. The sensor activation time 432 may be a time during which an illumination component is not activated, such as during illumination device activation time 422.

FIG. 4E shows an example sensor time and register bank setting which includes IT SYNC values 451 for lighting sensors such as lighting sensors 230 of FIG. 2A, IT_BANK SYNC values 452 for light sensors such as light sensors 230, IT SYNC values 451 for proximity sensors such as proximity sensors 240 of FIG. 2A, IT_BANK SYNC values 452 for proximity sensors such as proximity sensors 240, The RGB SYNC IT values 451 may determine the activation or integration times of a light sensor such as light sensors 230, where the stepping increase of the activation or integration is 50 us. As shown in the IT SYNC values 451, the activation or integration time range covers from 500 us to 1.25 ms. The IT_Bank corresponds to the multiplication factor of the IT SYNC value. For example, if IT_SYNC 451 is programmed to 500 us then the IT_Bank value 452 of "01" configures the light sensor activation or integration time to 1000 us. For proximity sensing, an example proximity sensing integration time is 100 us, The PS IT SYNC value 453 covers proximity integration time from 50 us to 200 us. For example, if the SYNC IT value of 453 is programmed to 50 us, then the corresponding IT_Bank value 454 of "01" would configure the proximity sensor integration time to 100 us.

Notably, based on the VSYNC signal 410 and the PWM driving signal frequency's driving timing, a high frequency timing value 421 and a sensor delay time 431, as further disclosed herein, are programmed to the corresponding registers. For instance, if the detected VSYNC signal 410 is 60 Hz and the PWM driving timing is 240 Hz, the value of '4166' is programmed to the high frequency trigger register. Accordingly, the high frequency trigger pule signal 420 is set to a period of 4.166 ms or 240 Hz. If a sensor delay time 431 of 3 ms is needed, then the value of '3000' may programmed to a RGB delay time register.

According to an implementation of the disclosed subject matter, a display device (e.g., display device 200 of FIG. 2A) may support a dynamic variable refresh rate (DVRR) such that the display device may be configured such that the display device's refresh rate can be dynamically adjusted. For example, the display device may comprise an AMOLD or a microLED display which supports both a 60 Hz a 90 Hz refresh rate. As another example, the display device may be an digital watch with a microLED display which supports both a 30 Hz and a 60 Hz refresh rate. Such changes in refresh rate may allow for power saving during use of such devices. Alternatively, or in addition, such DVRR capable devices may allow for enhanced performance when required (e.g., during operation of a video game, a higher refresh rate may be implemented).

According to a DVRR based implementation of the disclosed subject matter, as further disclosed herein, a change in cycle duration may be detected during a given cycle. The change in cycle duration corresponds to a modified refresh rate which may be modified based on one or more of a user setting change, a temperature change, an automatic setting change, or the like. An automatic setting change may be implemented based on hardware input, software input, or firmware input and may be caused by, for example, a program or type of program activating on the device, a sensor detecting a setting, a capability surplus (e.g., available device resource bandwidth) or deficit (e.g., constrained device resource bandwidth), or the like.

Figure 4F:
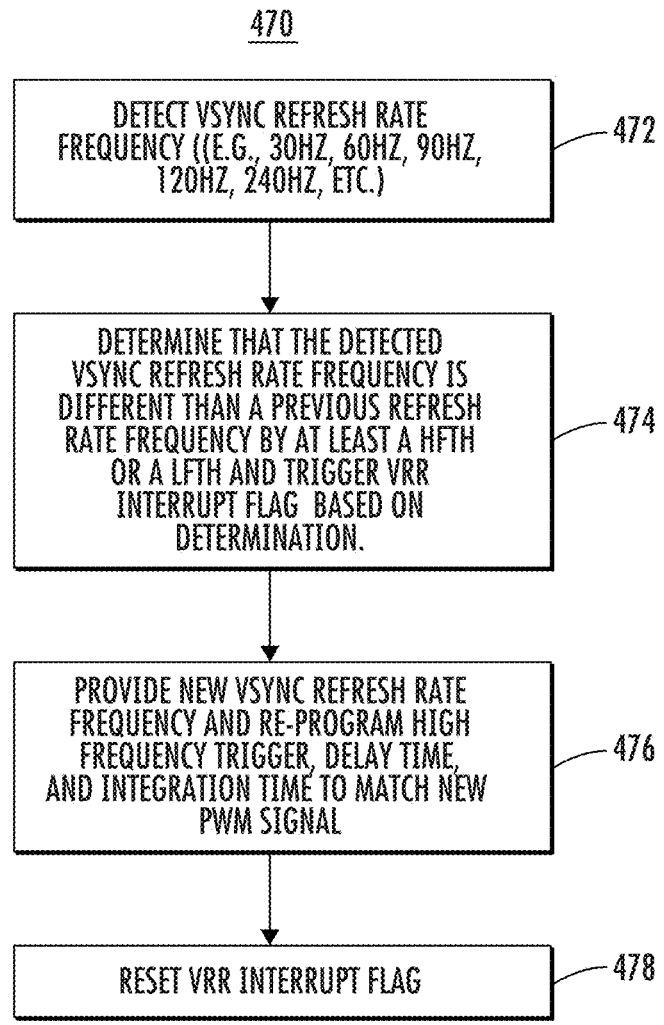
FIG. 4F is a flowchart for implementing a dynamic variable refresh rate (DVRR) technique.

FIG. 4F show a process 470 for a DVRR implementation in accordance with the subject matter disclosed herein. As shown at step 472 of the process 470 of FIG. 4F, a VSYNC cycle detector (e.g., such as VSYNC cycle detector 1210 of FIGS. 12A and 12B, as further disclosed herein) may detect a display refresh rate (e.g., 30 Hz, 60 Hz, 90 Hz, 120 Hz, 240

Hz, etc.). The VSYNC cycle detector may detect the display refresh rate in accordance with the techniques disclosed herein, such as those disclosed in step 310 and 320 of process 300 of FIG. 3 and in FIGS. 4A-4D.

At step 474 of process 400, the detected display refresh rate may be determined to be different than a display refresh rate detected by the VSYNC cycle detector during a previous cycle. The difference in the detected refresh rates may be greater than a high frequency threshold (HFTH) or a low frequency threshold (LFTH). The FIFTH may be a threshold amount such that if a detected refresh rate is greater than the previous detected refresh rate by at least the HFTH, then the process 470 continues to step 476 after step 474. Similarly, the LFTH may be a threshold amount such that if the detected refresh rate is less than the previous refresh rate by at least the LFTH, then the process 470 continues to step 476 after step 474. According to an implementation, the FIFTH and the LFTH may be the same value (e.g., 5 Hz). Alternatively, the FIFTH may be different than the LFTH (e.g., the HFTH may be 5 Hz, and the LFTH may be 7 Hz). According to an implementation, the HFTH and/or the LFTH may be a percentage value (e.g., 3%).

Further, at step 474, based on a determination that a given detected display refresh rate is different than a previous display refresh rate by at least a HFTH or a LFTH, a variable refresh rate (VRR) interrupt flag register may be triggered. The VRR interrupt flag register may be triggered by any applicable technique such as by changing a binary value from a 0 to a 1, by changing a bit value, applying a voltage, or the like.

According to an implementation of the disclosed subject matter, upon a trigger of the VRR interrupt flag at step 474, a driver may be configured to initiate the process 300 of FIG. 3 at step 476 of process 470 of FIG. 4F. Notably, upon a trigger of the VRR interrupt flag at step 474, a VSYNC frequency may be determined (e.g., step 310 of process 300 of FIG. 3), a high frequency trigger pulse may be determined (e.g., step 320 of process 300 of FIG. 3), a delay time may be applied to the high frequency trigger pulse determined (e.g., step 330 of process 300 of FIG. 3), and one or more sensors may be activated based on the high frequency trigger pulse and the delay time (e.g., step 340 of process 300 of FIG. 3).

At step 478 of FIG. 4F, the VRR interrupt flag may be reset such that the system may return to step 472. Subsequent changes in refresh rates that are greater than a HFTH or LFTH may be detected and the process 470 may continue accordingly.

According to an implementation of the disclosed subject matter, an automatic sync switch timing (ASST) scheme may be implemented. The ASST scheme may be implemented by applying and/or storing an internal synchronization signal with an internal synchronization signal cycle, when a VSYNC signal is not actively available. Notably, the internal synchronization signal may be an initialized signal that is available prior to the first instance of a VSYNC signal being generated in a given device, and/or may be determined based on the last available VSYNC signal prior to a display device entering an off or sleep state. The internal synchronization signal may enable operation in accordance with the implementations disclosed herein without the use of a software solution, while a display device is entering an idle or sleep state. To clarify, an idle or sleep state of a display device may correspond to when the display device is in an idle or battery saving mode, but is still otherwise powered on. More specifically, the idle or sleep state is a state when a VSYNC signal is not generated by the display device.

In accordance with an ASST based implementation, the ALS and PS techniques disclosed herein that are generally implemented using a VSYNC signal may, alternatively, be implemented using the internal synchronization signal in the absence of the VSYNC signal.

Figure 4G:
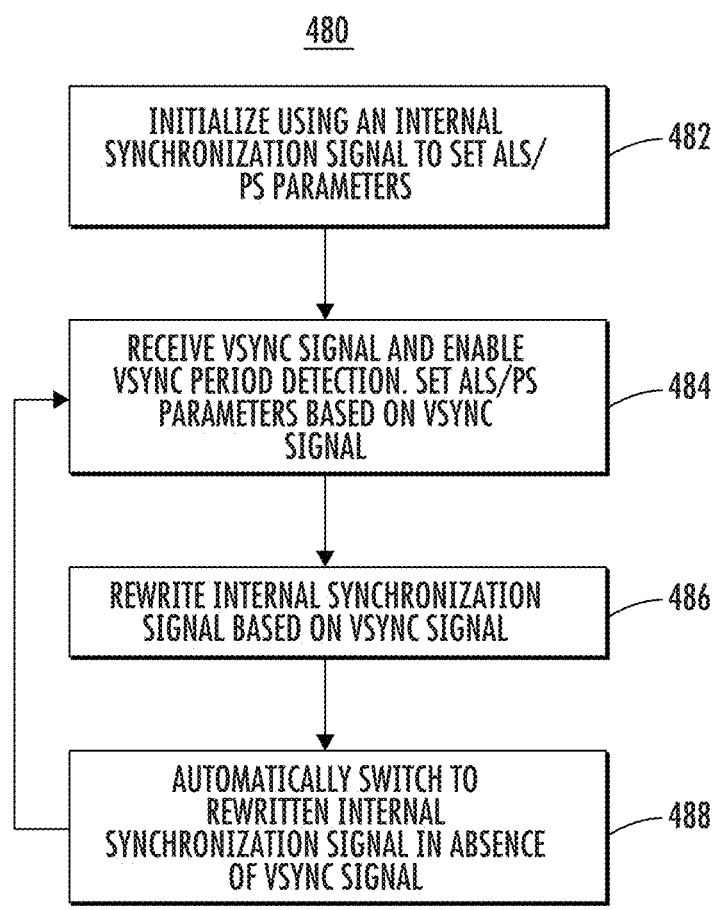
FIG. 4G is a flow chart for implementing an automatic sync switch timing (ASST) scheme.

FIG. 4G show a process 480 for an ASST implementation in accordance with the subject matter disclosed herein. As shown at step 482 of the process 480, a display device (e.g., display device 200 of FIGS. 2A-2C) may be initialized using an internal synchronization signal. The internal synchronization signal may be pre-programed through physical components, registers, or the like. At step 282, the internal synchronization signal implemented during initialization may be applied to set ALS/PS parameters. For example, the internal synchronization signal may be used to determine a high frequency trigger pulse and a delay may be applied to the determined high frequency trigger pulse such that the ALS and/or PS sensors are activated based on the high frequency trigger pulse and delay times determined based on the internal synchronization signal.

At step 484, the display device (e.g., display device 200 of FIGS. 2A-2C) may generate a VSYNC signal (e.g., if switching to an active or on state). Upon the generation of the VSYNC signal, VSYNC period detection maybe activated and the VSYNC signal may be applied, as disclosed herein. For example, the VSYNC signal may be used to determine a high frequency trigger pulse and a delay may be applied to the determined high frequency trigger pulse such that the ALS and/or PS sensors are activated based on the high frequency trigger pulse and delay times determined based on the VSYNC signal.

Further, at step 486 of process 480, the internal synchronization signal may be rewritten to materially match the VSYNC signal received at step 484. The rewritten internal synchronization signal may be stored such that it can be applied at a later time. At a later time, the VSYNC signal may no longer be available. For example, the display device may enter a sleep or idle mode due to a threshold period of time elapsing since use of the display device and/or display screen. At step 488, in the absence of the VSYNC, the rewritten internal synchronization signal, rewritten at step 486, may be applied to determine the ALS and/or PS parameters, as disclosed herein. The internal synchronization signal may be applied, as disclosed at step 488, until the VSYNC signal is available again. The steps 484 to 488 may repeat during operation of the display device, FIG. 4I1 shows a diagram of an ASST implementation 490 in accordance with the subject matter disclosed herein. As shown, an internal synchronization signal 491, and/or a VSYNC signal 492 may be used to make a SYNC decision 493. Prior to an AMOLED panel turning on at time 494, the display device is in an internal synchronization mode. During the internal synchronization mode, the SYNC decision 493 is based on the internal synchronization signal 491. At time 494, a VSYNC signal 495*a* is detected and the duration of the cycle of the VSYNC signal is determined at time 495*b*. Upon the detection of the duration of the VSYNC signal time, the display device switches the SYNC decision 493 from the internal synchronization mode to the VSYNC mode, at time 495*b*. To clarify, the SYNC decision 493 defaults to the VSYNC signal 492 when the VSYNC signal 492 is available and at least one cycle of the VSYYNC signal 492 has elapsed.

Figure 4H:
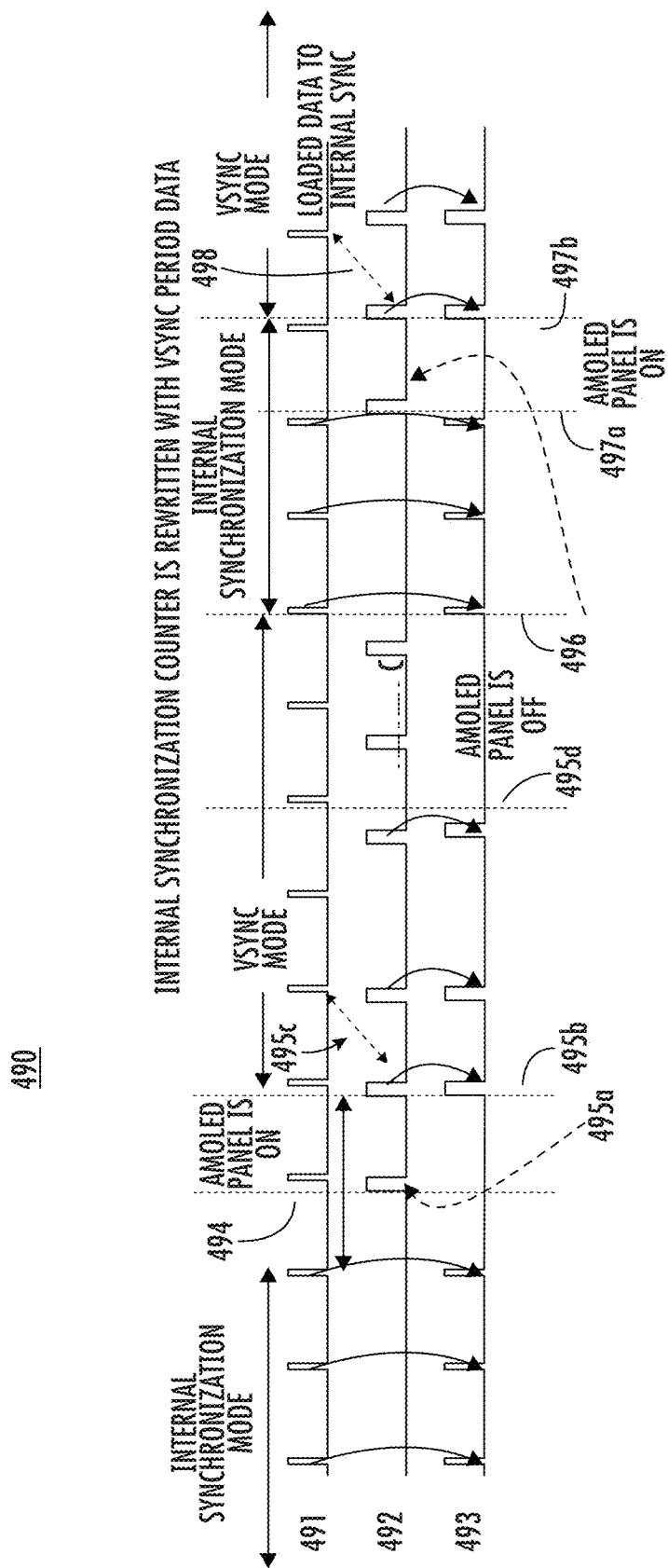

Further, after time 495*b*, the internal synchronization signal 491 is rewritten at 495*c*, based on the VSYNC period data (e.g., collected between time 495*a* and time 495*b*). The display device continues to operate based on the VSYNC data until it is not available. At time 495*d*, the AMOLED panel is off and the VSYNC signal terminates. After a threshold number of cycles of not detecting the VSYNC signal (e.g, 3 cycles, as shown in FIG. 4H), the display device changes back to the internal synchronization mode at time 496, due to the lack of detecting the VSYNC signal. Notably, by time 496, the threshold number of undetected VSYNC cycles may cause the display device to change to the internal synchronization mode. The display device may switch to an on or active state at time 497*a* such that the VSYNC signal 492 is provided. A first cycle length of the VSYNC signal may be detected at time 497*b*. The display device may stay in the internal synchronization mode until the time 497*b* and may switch to the VSYNC mode based on the detection of the VSYNC signal cycle length at time 497*b*. At 498, the VSYNC cycle length detected at time 497*b* may be used to rewrite the internal synchronization counter.

Figure 6A:
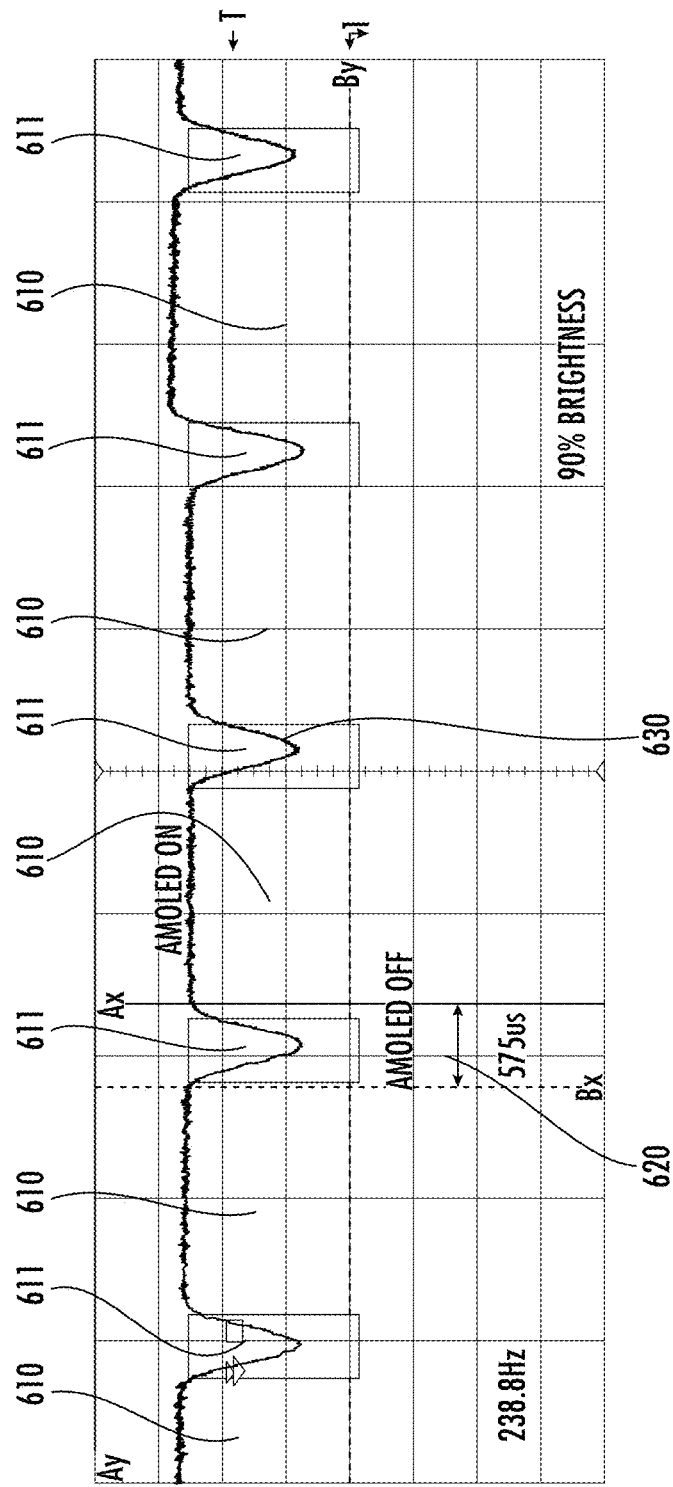
FIG. 6A is an image of states of illumination components and a corresponding pulse width modulation signal.

FIG. 6A shows an image of an illumination component on and off times while a display device, such as display device 200 of FIG. 2A is set to a 90% brightness setting. As shown, times 610 correspond to times when an illumination component is activated and times 611 correspond to times when the illumination component is deactivated. The PWM signal indicated by signal line 630 corresponds to approximately a 238.8 Hz signal such that the cycle length of the illumination component activation and deactivation cycle is approximately 4.1 ms and, as shown by time duration 620, the deactivation time is 575 us. Notably, in this example 90% display device brightness setting, the illumination component is activated for a majority of the illumination activation and deactivation cycle such that a sensor or group of sensors can only be activated for a maximum of 575 us.

Figure 6B:
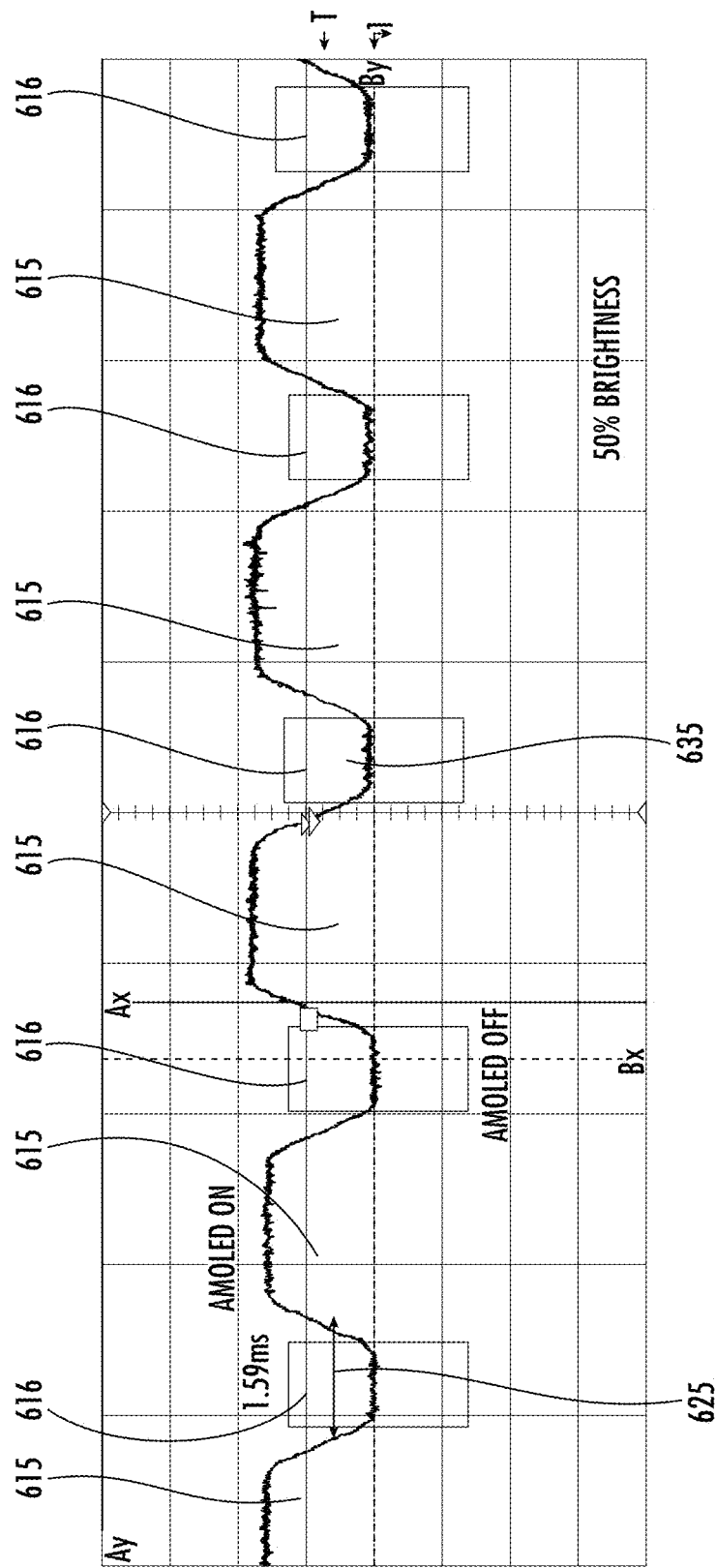
FIG. 6B is another image of states of illumination components and a corresponding pulse width modulation signal.

FIG. 6B shows another image of an illumination component on and off times while a display device, such as display device 200 of FIG. 2A is set to a 50% brightness setting. As shown, times 615 correspond to times when an illumination component is activated and times 616 correspond to times when the illumination component is deactivated. The PWM signal indicated by signal line 635 corresponds to a similar 238.8 Hz signal as FIG. 6A such that the cycle length of the illumination component activation and deactivation cycle is approximately 4.1 ms, However, as shown by time duration 625, the deactivation time for the illumination component is 1.59 ms which is approximately three times the deactivation time of the illumination component when the display device is set at 90% brightness, as shown in FIG. 6A. Notably, in this example 50% display device brightness setting, the illumination component is activated for a shorter illumination activation and deactivation cycle when compared to the activation and deactivation cycle of the device in FIG. 6A, such that a sensor or group of sensors can be activated for a maximum of 1.59 ms. Accordingly, the lower brightness setting shown in FIG. 6B may allow for larger sensing times which may result in greater sensing accuracy.

According to an embodiment of the present teachings, the maximum sensing times (e.g, that result in sensor activation times 432, 433, 434 of FIG. 4A) may be preset to, for example, the duration of deactivation times (e.g., 620 of FIG. 6A and 625 of FIG. 6B) when a given display device is set to a maximum brightness. According to this embodiment, the sensor activation times will always be at the lowest duration of time when an illumination component is deactivated.

According to another embodiment of the present teachings, the sensing times may be dynamic and may be determined based on a given brightness setting. According to this embodiment, the sensing times (e.g., that result in sensor activation times 432, 433, 434 of FIG. 4A) may be set to 575 us in the example shown in FIG. 6A Where the brightness is set to 90% and may be set to 1.59 ms in the example shown in FIG. 6B where the brightness is set to 50%.

Figure 6C:
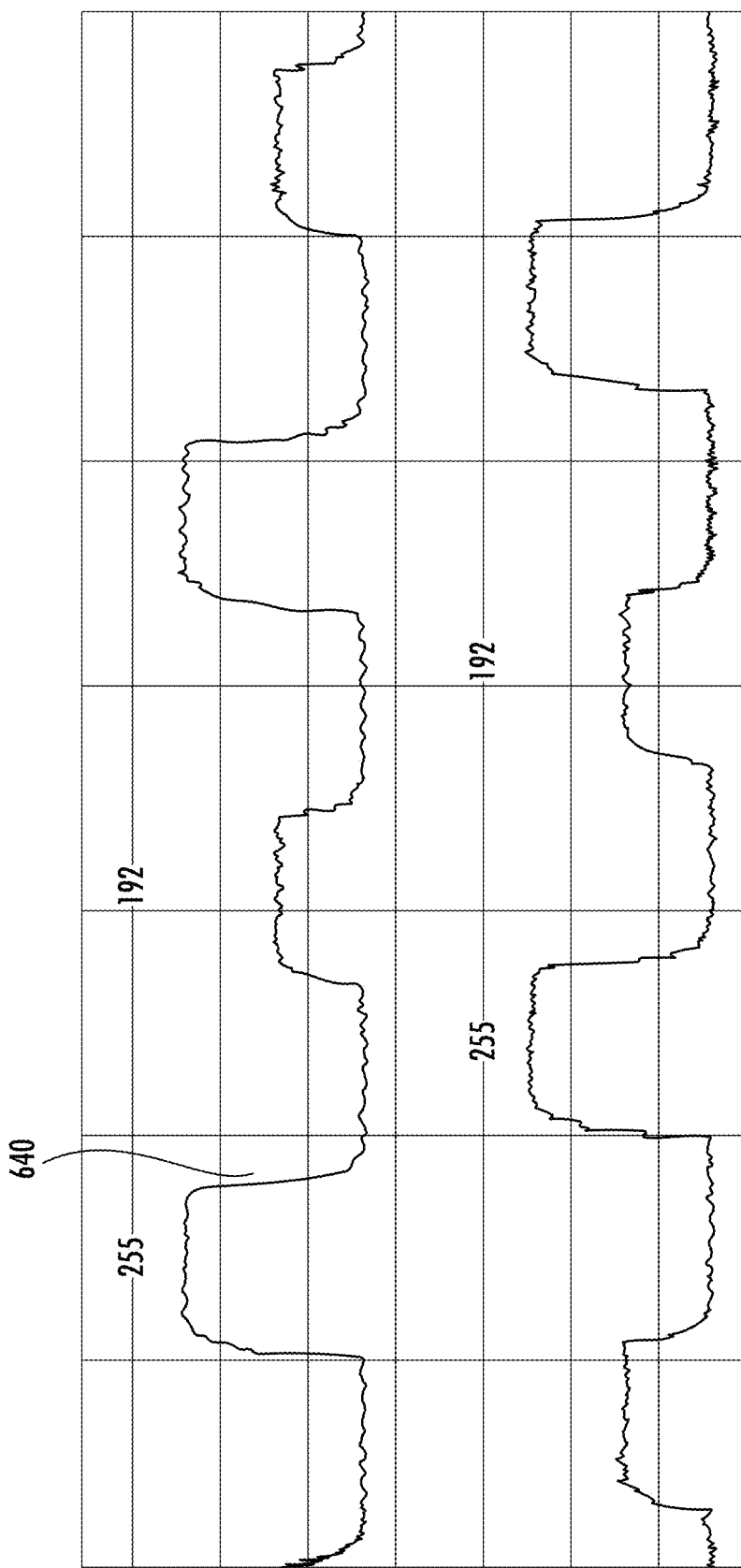
FIG. 6C is another image of states of illumination components and a corresponding pulse width modulation signal.

FIG. 6C shows another image of an illumination component on and off times while a display device, such as display device 200 of FIG. 2A is set to a 50% brightness setting. The PWM 640 shown in FIG. 2C cycles once per corresponding VSYNC cycle such that it exhibits a 50% on and 50% off driving scheme.

To summarize the process 300 of FIG. 3*a*, as shown in the diagram provided in FIG. 4A, a VSYNC signal 410 may be provided by a TCON for a display device. A cycle length 411 of VSYNC signal 410 may be determined based on detecting one or more rising edge and/or falling edge of the VSYNC signal 410. A high frequency trigger pulse 420 may be determined based on the VSYNC signal 410 and may be determined based on detecting a PWM signal corresponding to activation and deactivation times of one or more illumination components. The high frequency trigger pulse 420 may have a cycle length 421 which is less than the cycle length 411 of the VSYNC signal 410. The high frequency trigger pulse 420 may split the VSYNC signal 410 and the high frequency trigger pulse 420 cycle length may include a delay 431 and a sensor activation time 432. The delay 431 may be determined based on the location of a sensor or group of sensors which are activated at sensor activation times 432, 433, and 434. The delay 431 may enable the sensor or group of sensors to activate at times that are different than illumination component activation times 422, 423, 424, and 425 such that the sensor or group of sensors are activated when the illumination component is deactivated. Notably, the sensor or group of sensors may be activated at sensor activation times 432, 433, and 434 when internal light reflected based on an illumination component activation is not present, such that the corresponding sensor readings are not affected by such internal light.

As shown in FIG. 2A, one or more light sensors 230 and proximity sensors 240 may be provided in a sensor layer 220. A light sensor 230 may be configured to sense ambient light wavelengths 210 and may provide the resulting sensed data to a processor. The ambient light wavelengths 210 sensed by light sensors 230 may be adulterated if one or more illumination components 216 are activated at the time when the light sensors 230 are activated to sense ambient light wavelengths 210. Accordingly, the process 300 of FIG. 3, as exemplified in FIGS. 4A-4D provide a technique that configures a sensor or group of sensors to active while corresponding illumination components are deactivated. Accordingly, process 300 of FIG. 3 enables light sensors to sense ambient light wavelengths 210 without the adulteration effect of internal light 216B.

Traditionally, proximity sensors in a display device are not located under the surface layer of a display device as signals emitted by such proximity sensors interfere with the visible operation of the display device. FIG. 7 shows example results of an image of operating an IR proximity sensor below a surface layer 705 of a display device 700. Operation of an IR proximity sensor can result in visible dark spots, such as dark spot 720 visible on the surface layer 705 of display device 700. The dark spot 720 can be the result of activating illumination components of the display device 700 while also activating the IR proximity sensor, such that the signal emitted by the IR proximity sensor interferes with the light illuminated by illumination components, resulting in the dark spot 720.

The process 300 of FIG. 3, as exemplified in FIGS. 4A-4D provides a technique that prevents or mitigates dark spots, such as dark spot 720 of FIG. 7 as, according to a proximity sensor is activated while corresponding illumination components are deactivated such that the resulting visible effect is void of dark spots.

Additionally, operation of proximity sensors, such as proximity sensors 240 of FIG. 2A may be further configured as provided in process 800 of FIG. 8.

At step 810, a proximity sensor may be activated. A proximity sensor may be an IR sensor, upon activation, and may emit an IR signal towards the surface layer of a display device such that the IR signal or a component of the IR signal exits the display device via the surface layer. The IR signal may be emitted by the proximity sensor and may reflect of an external surface e.g., if the display device is proximate to a user's skin when the user places the display device next to the user's ear during a phone call). Alternatively, the IR signal may be emitted by the proximity sensor and may not be incident upon an external object (e.g., if no external object is proximate to the display device) and, thus, may not be reflected.

Accordingly, at step 820 of process 800 of FIG. 8, the proximity sensor may be configured to sense reflected IR signal (e.g., IR reflection values). A reflected IR signal may be received by the proximity sensor and the proximity sensor may be configured to sense a distance between the display device and the external object. The proximity sensor may be configured to sense the distance based on one or more of a timing, amplitude, phase and/or the like of the reflected IR signal. The proximity sensor may provide proximity sensed data to a processor and the processor may maintain or modify the operation of a display device based on the proximity sensed data, as further described herein. At step 820, the proximity sensor configured to sense the reflected IR signal may not sense a reflected IR signal or may sense an reflected IR signal that is below a given threshold value (e.g., signal amplitude value). The result of step 820 may be a proximity determination which may be, for example, a proximity value (e.g., if a reflected IR signal is received) or a null proximity determination.

At step 830 of process 800 of FIG. 8, a display device operation determination may be made based on the result of step 820. The display device operation determination may be made by any component such as, for example, a processor or a sensor hub device that receives the result of step 820. For example, if the proximity value is larger than a HTH value, the sensor hub or processor may send a signal that causes the display driver to turn off, reducing the power consumption. According to this example, the proximity value being greater than the HTH value may correspond to the smartphone device being in close proximity of user's head. Continuing the example, if the proximity value is smaller than an LTH value, then the sensor hub or processor may turn on the display driver to resume a normal display screen. According to this example, the proximity value being smaller than the LTH value may correspond to the smartphone device not being in close proximity of user's head. The display device operation determination may include, but is not limited to, activating a display device, deactivating a display device, modifying a property of a display device (e.g., brightness (LUX), hue, saturation, correlated color temperature (CCT), tristimulus values (XYZ or xy), etc) or a combination thereof. As an example, the result of step 820 when a proximity sensor is configured to sense a reflected IR signal may be that that the proximity sensors senses an external object within a proximity threshold (e.g., within 6 inches) of the display device. Based on this determination, at step 830, a display device operation determination may be made that the display device should cease displaying for at least a given amount of time.

At step 840 of process 800 of FIG. 8, a proximity sensor activation frequency may be determined based on the result of step 820. The proximity sensor activation frequency may maintain a current frequency, increase the frequency, or decrease the frequency of proximity sensor activation. Notably, decreasing the frequency of proximity sensor activation may further mitigate or prevent the dark spot effect, as shown in FIG. 7. The proximity sensor activation frequency may be determined based on the result of step 820 such that a given proximity or range of proximities may result in a greater activation frequency and a different proximity or range of proximities may result in a lesser activation frequency, as further described herein. The determined proximity sensor activation frequency may be provided as an input to step 810 such that the proximity sensor may be activated, at a subsequent iteration of step 810, based on the determined frequency and the process 800 may continue to cycle for the subsequent iteration as well as additional iterations thereafter.

FIG. 9A shows an example implementation of step 840 of process 800 of FIG. 8. As shown, a SYNC signal 910 (e.g., VSYNC signal as described herein) may be provided and a proximity sensor may be configured to activate during every alternating cycle of the SYNC signal 910, as shown at signal activation 920. The proximity sensor may be an IR 940 nm emitter and may be provided under a light emitting layer of the display device, such as the proximity sensors 240 of FIG. 2. As show at signal activation 920, the proximity sensor is activated once for every two SYNC signal 910 cycles. Signal activation 930 shows the proximity sensor at a time subsequent to all the signal activation 920. According to the example shown in FIG. 9A, the result of the proximity sensor activating at time 930*a* by transmitting a signal and sensing a reflected signal (e.g., the result of step 820 of process 800) may be that the proximity sensor determines that the proximity sensor is within 2 inches of an external object. According to this example, the proximity threshold may be 6 inches such that a distance under 6 inches is considered a low proximity distance. As an example, a user using the corresponding display device may be using the display device to make a phone call such that the display device is next to the user's ear. Accordingly, at step 830 of process 800, and based on the result of sensing for a reflected signal indicating a proximity distance of 2 inches (e.g., the result of step 820 of process 800), the display device may temporarily turn off its display to conserve battery life and reduce the heat generated by the display device. Further, at step 840 of process 800, a determination may be made that the proximity sensor activation frequency can be reduced based on the result of sensing the reflected signal and determining that the distance is below the proximity threshold. Accordingly, as shown in FIG. 9A, the frequency of signal activation 930 may be delayed after the proximity sensor activating at time 930*a* such that the subsequent that the proximity sensor activates is at time 930*b* which is four cycles after the previous sensor activation at time 930*a*. Notably, the frequency of signal activation 920 for the proximity sensor is twice the frequency of signal activation 930 as a result of the proximity between the sensor and external object being less than the proximity threshold.

Figure 9B:
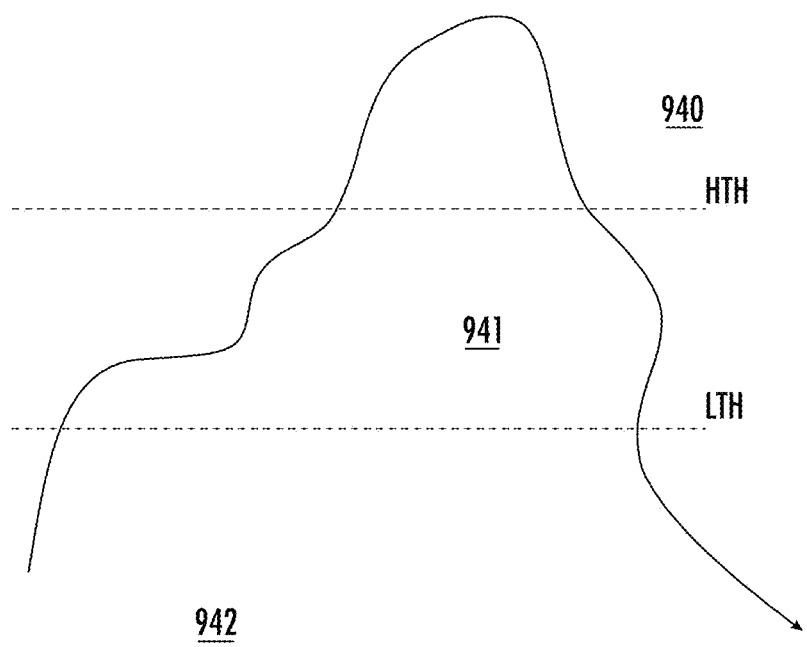
FIG. 9B is a diagram of proximity-based states.

According to an embodiment of the present teachings, a high threshold (HTH) and a low threshold (LTH) may be applied to determine a proximity sensor sensing rate. The HTH and/or LTH may be predetermined or may be dynamically determined. A predetermined setting may be preprogrammed or may be determined based on a user setting or user input. The HTH and/or LTH may be dynamically determined based on historical use, machine learning, or the like. A proximity sensor sensing rate may be determined in accordance with FIG. 9B. As shown in FIG. 9B, a HMI may be set to, for example, 2.5 cm and a LTH may be set to, for example 5 cm. Zone 940 may correspond to a proximity of closer than 2.5 cm, zone 941 may correspond to a proximity between the HTH and the LTH such that the proximity is between 2.5 cm and 5 cm in the example of FIG. 9B. Zone 942 may correspond to a proximity of larger than 5 cm.

Zones 940 and 942 may be considered stable zones such that the proximity sensor sensing rate is a slow sensing rate when compared to zone 941 which is considered a transition zone where the proximity sensor sensing rate is a high sensing rate as the proximity crosses the region from 941 to 940 or from 941 to 942. As an example, stable zone 940, which corresponds to a proximity of less than 2.5 cm may correspond to a user placing a mobile phone next to their ear, such as while on a phone call or may correspond to when the mobile phone is in a user's pocket. Stable zone 942, which corresponds to a proximity of greater than 5 cm may correspond to when the mobile phone is placed on a surface and may not be in use. Transition zone 941, which corresponds to proximity between 2.5 cm and 5 cm, may correspond to when a user is holding the mobile phone and may be using the mobile phone. Accordingly, the proximity sensor sensing rate may be low when the mobile phone is in stable zone 940 (e.g., while the mobile phone is at a user's ear or in the user's pocket) and stable zone 942 (e.g., while the mobile phone is on a surface). The proximity sensing rate may be high when the mobile phone is moving from the transition zone 941 into stable zone 940 or when the mobile phone is moving from transition zone 941 to stable zone 942 (e.g., when mobile phone is on a surface). Although actual proximity distances (e.g., 2.5 cm and 5 cm) are provided herein, it will be understood that proximity may be determined based on the signal strength (e.g., IR reflection value) of a proximity signal, Accordingly, the HTH may be a smaller value than the LTH such that the signal strength as an object is further may be lower and such that the signal strength as the object is closer may be higher.

Figure 9C:
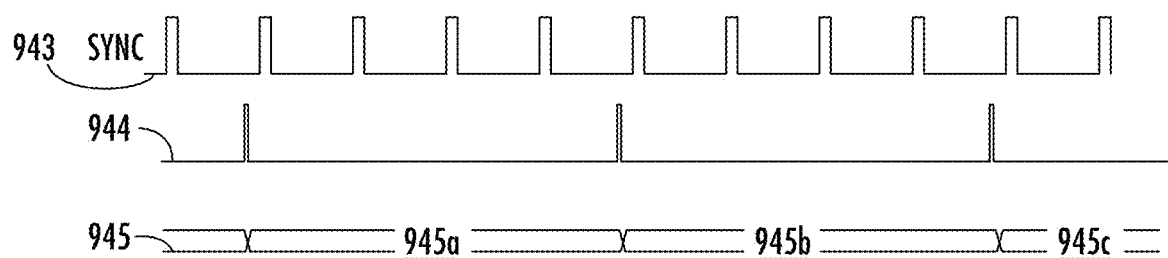
FIG. 9C is another diagram of proximity sensor activation times.

FIG. 9C shows an example proximity sensor sensing rate when a display device is in a stable zone, such as zone 940 or zone 942 of FIG. 9B. As shown, the signal activation 944 may occur once every four SYNC cycles 943 such that the time gap 945 between each signal activation 944 is four SYNC cycles, as indicated by the lengths 945A, 945B, and 945*c* corresponding to four SYNC cycles of the SYNC signal 943.

Figure 9D:
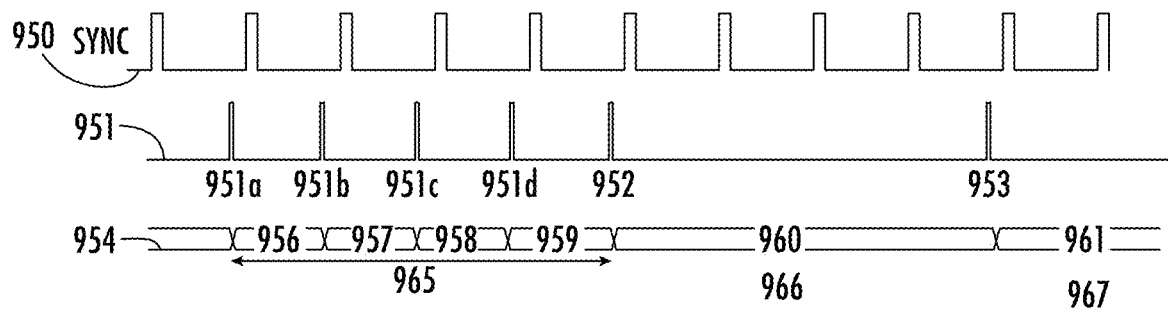
FIG. 9D is another diagram of proximity sensor activation times.

FIG. 9D shows an example proximity sensor sensing rate when a display device is changing from the transition zone 941 to a stable zone such as zone 940 of FIG. 9B, as indicated by duration 965. As an example, a proximity sensor's activation times 951 may include first proximity sensor activation time 951*a*. The response from sensing a reflected signal based on an IR signal transmitted at the first proximity sensor activation time 951*a* may result in the determination of a proximity value that is crossing the HTH (e.g., while the mobile phone is at a user's ear or in the user's pocket) or the crossing the LTH level (e.g., while the mobile phone is on a surface). Accordingly, the proximity sensing rate may be set to a high frequency such that subsequent proximity sensor activation occurs during the subsequent cycle of SYNC signal 950, as shown by the second proximity sensor activation time 951*b*. The proximity sensing rate may continue to be set to a high frequency for four cycles of the SYNC signal 950, as indicated by the time duration 965 which is broken up into 956, 957, 958 and 959 which each occupy a SYNC cycle of SYNC signal 950. After the expiration of the four cycles, a determination may be made that the proximity of the display device is within a stable zone (e.g., zone 940 or 942 of FIG. 9B). Accordingly, the proximity sensing rate may be set to slow frequency such that, starting at proximity sensor activation time 952, the proximity sensor activation occurs after four cycles of SYNC signal 950 during time durations 966 and 967, corresponding to the signal proximity sensor activation times 952 and 953.

Figure 10:
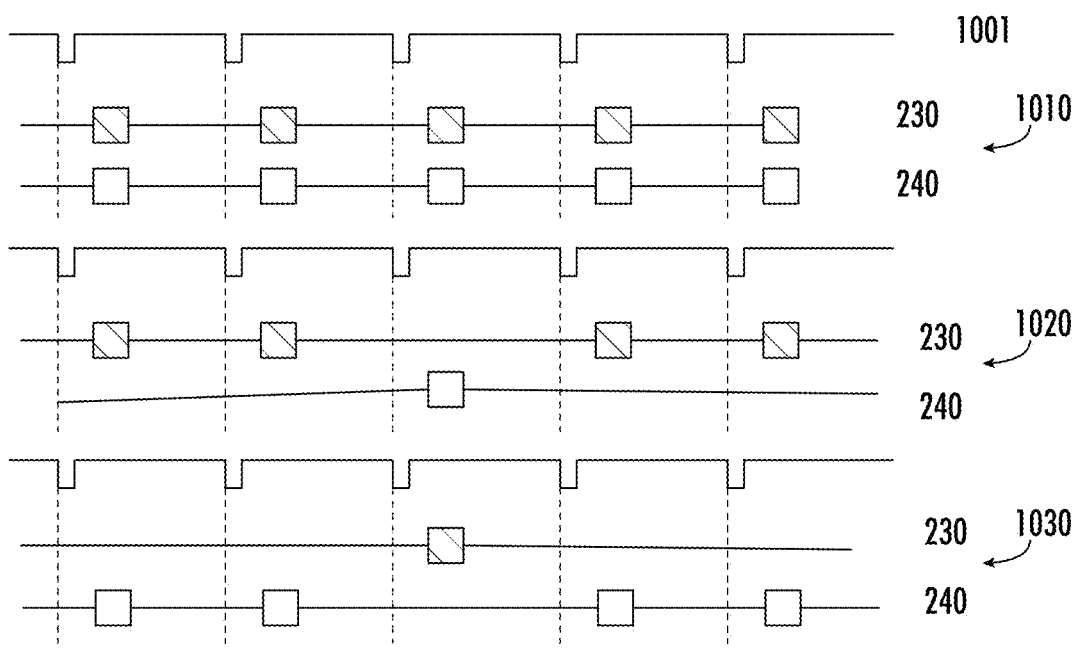
FIG. 10 is a diagram of sensor operation modes.

As shown in FIG. 2A, multiple sensors may be provided and may include light sensors 230 and proximity sensors 240. The multiple sensors may be placed within the same area occupied by a reflection affect area 250 of FIGS. 2B and 2C. As shown in FIG. 10, light sensors 230 and proximity sensors 240 may activate relative to each other based on SYNC signal 1001. For example, both the light sensors 230 and proximity sensors 240 may activate at the same time as shown in operation mode 1010, the light sensors 230 may activate more often than proximity sensors 240 as shown in operation mode 1020, or the light sensors 230 may activate less often than proximity sensors 240 as shown in operation mode 1030. A given operation mode may be determined based on predetermined criteria or based on dynamically determined criteria, such as based on the attributes sensed by one or more respective sensors (e.g., amount of ambient light or proximity).

Figure 11:
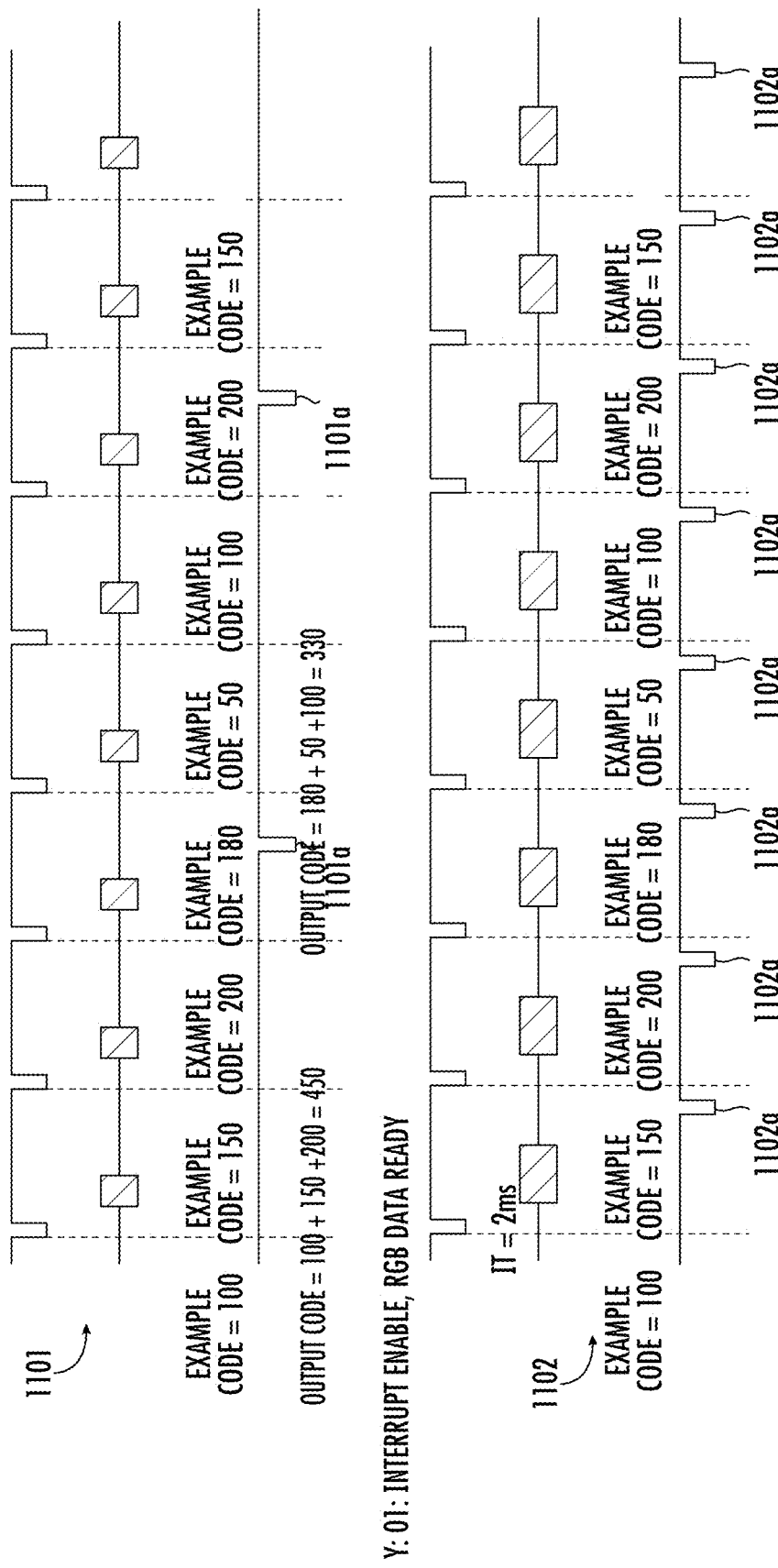
FIG. 11 is a diagram of accumulation functions.

According to an embodiment of the present teachings, an accumulation function may be applied which may define the frequency of outputting sensed data. The accumulation function may be applied such that sensed data is output after a set number of sensing cycles, as shown based on accumulation function 1101 of FIG. 11, where sensed data is output after three sensing cycles at output times 1101*a*. Alternatively, the accumulation function may be applied such that sensed data is output after each sensing cycle, as shown based on accumulation function 1102, where sensed data is output after each sensing cycle at output times 1102*a*. The accumulation function may be predetermined or may be dynamically determined. For example, the accumulation function may be set at a low frequency such that multiple sensing cycles are accumulated before outputting the sensed data (e.g., accumulation function 1101) when a proximity sensor is in a stable zone (e.g., as described in FIG. 9B).

Figure 12A:
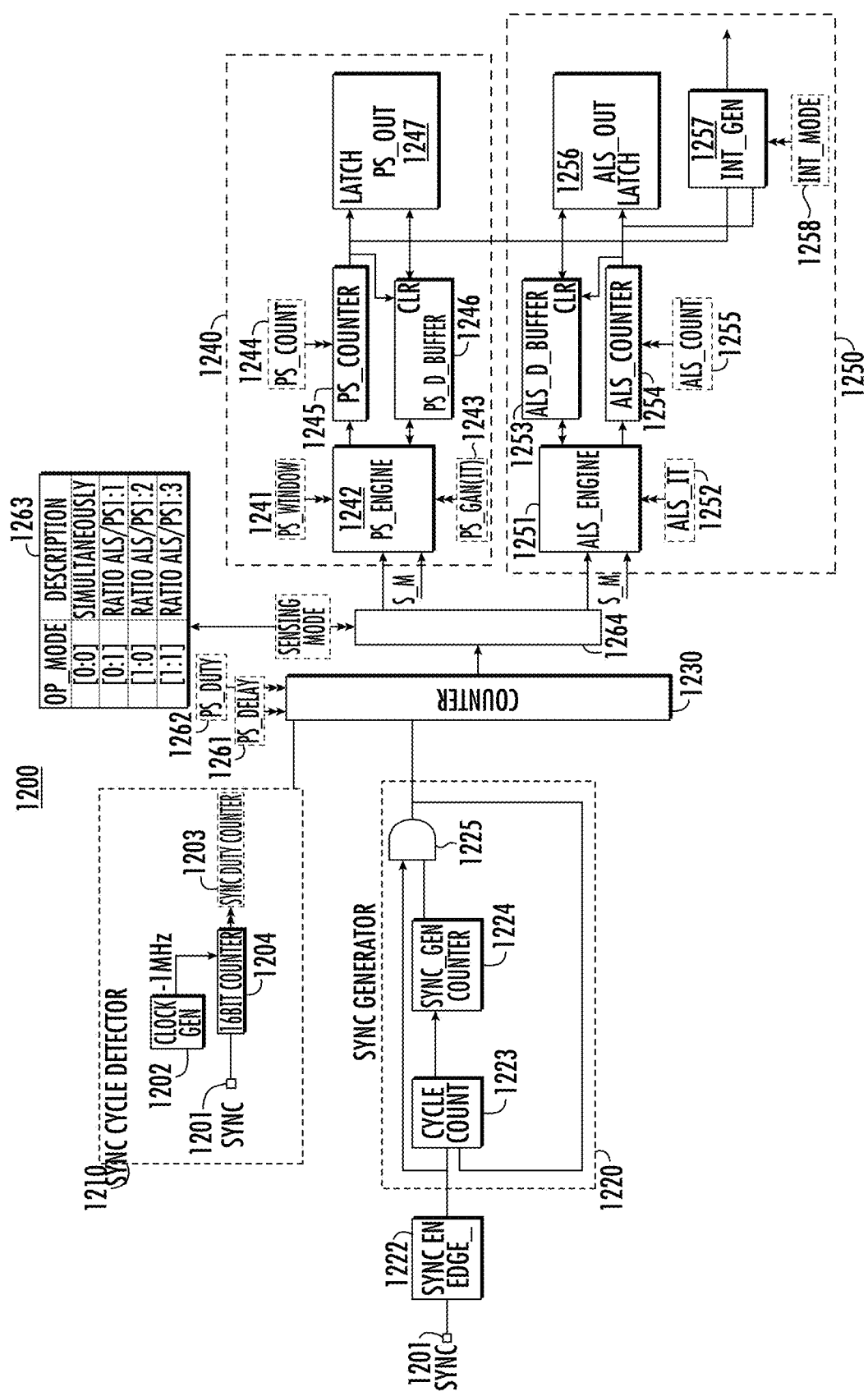
FIG. 12A is a system diagram of sensor activation times.

FIG. 12A shows a system 1200 which shows an implementation of the present teachings. Block 1210 shows a VSYNC cycle detector as described in step 310 of process 300 of FIG. 3. A VSYNC input signal 1201 may be provided by a TCON and may have a frequency of, for example, 60 Hz, 90 Hz, 120 Hz, 240 Hz, or the like. The VSYNC input signal may be combined with a clock generator 1202 (e.g. 1 MHz clock generator) and may be provided to a counter 1204 (e.g., 16 bit counter). The counter 1204 may provide the clock aligned VSYNC signal to SYNC duty counter 1203 and the clock duty counter 1203 signal may be provided to a counter 1230. The edge data may be provided to a cycle counter 1223 and an AND gate 1225. The cycle counter 1223 may be a SYNC counter or may be a component of the SYNC counter. The cycle counter 1223 may provide the count to a SYNC_Gen counter 1224 which may be configured to determine the duration of a VSYNC input signal 1201 cycle length. The SYNC_GEN Counter may be a SYNC wait signal or may receive a SYNC wait signal. The output of the cycle counter 1223 may be provided to the AND gate 1225 and an implementation of a logical conjunction may be provided to counter 1230.

At block 1220 a high frequency trigger pulse may be generated and may also be provided to counter 1230. The VSYNC input signal 1201 may be provided to a SYNC Edge detector which may detect rising edges (e.g., rising edges 413 of FIG. 4B) and/or falling edges (e.g., falling edges 414 of FIG. 4B) of the VSYNC input signal 1201.

A delay signal 1261 (as described in FIG. 4D) and a duty signal 1262 may also be provided to counter 1230. The output of the counter 1230 may be provided to a sensing mode determination block 1264 which may determine a sensing mode, as described in FIG. 10 based on, for example, logic table 1263. The output of the counter 1230 may be combined with the sensing mode determination block 1264 and may be provided to proximity sensing block 1240 and light sensing block 1250.

Proximity sensing block 1240 may include a PS_Engine 1242 that receives inputs from the output of the sensing mode determination block 1264, PS_Window 1241 and PS_GAN(IT) 1243. The PS_Engine 1242 may generate and provide an output to the PS_Counter 1245 which also receives an input from PS_Count 1244 to provide a proximity counter signal which activates a proximity sensor via PS_OUT 1247. According to an implementation, the PS_Engine 1242, PS_Counter 1245 and PS_OUT 1247 provide inputs to a PS_D_Buffer 1246 which may adjust the timing of the PS_OUT 1247.

Ambient light sensing block 1250 may include an ALS_Engine 1251 that receives inputs from the output of the sensing mode determination block 1264 and ALS_IT 1252. The ALS_Engine 1251 may generate and provide an output to the ALS_Counter 1254 which also receives an input from ALS_Count 1255 to provide a ALS counter signal which activates a light sensor via ALS_OUT 1256. According to an implementation, the ALS_Engine 1251, ALS_Counter 1254 and ALS_OUT 1256 provide inputs to an ALS_D Buffer 1253 which may adjust the timing of the ALS_OUT 1256. The outputs of the PS_Counter 1245 and ALS_Counter 1254 may also be provided to an INT_GEN 1257 which also receives an INT_MODE 1258 signal.

Figure 12B:
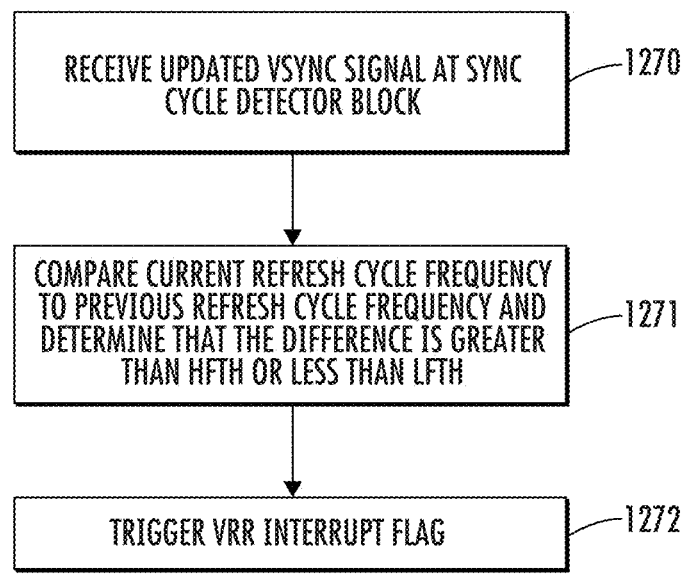
FIG. 12B is a flowchart for implementing the DVRR technique.

FIG. 12B shows an implementation of the disclosed subject matter that includes the DVRR detection technique as disclosed herein. The VSYNC cycle detector 1210 of FIG. 12A may receive a VSYNC input signal 1201 from a TCON, at step 1270 of FIG. 12B. The VYSNC input signal 1201 may have a refresh rate frequency of, for example, 60 Hz, 90 Hz, 120 Hz, 240 Hz, or the like. The detected refresh rate frequency may be provided to block 1271. At block 1271, the current refresh rate frequency may be compared to a previous cycle's refresh rate frequency. The comparison may include determining if the difference between the previous refresh rate frequency and the current refresh rate frequency is greater than a HFTH or LFTH value, as disclosed herein.

If, at block 1271, a determination is made that the difference between a previous refresh rate frequency and a current refresh rate frequency is either greater than the HFTH or less than the LFTH, then a VRR interrupt flag may be triggered at block 1272. Upon a trigger of the VIM interrupt flag, a driver may be configured to determine updated parameters in accordance with FIGS. 3, 4A-4E. The updated parameters may include, as shown in FIG. 12A, the sync counter 1223 of a sync generator 1220 of FIG. 12A, the delay signal 1261 of counter 1230, the PS integration time (PS_window) 1241 of proximity sensing block 1240, and the ALS integration time (ALS_IT) 1252 of ambient light sensing block 1250 and may correspond to the updated PWM signals that correspond to the updated refresh rate frequency, as exemplified in FIGS. 6A-6C. A system register may be updated based on the updated parameters, as exemplified in FIG. 4E.

Figure 12C:
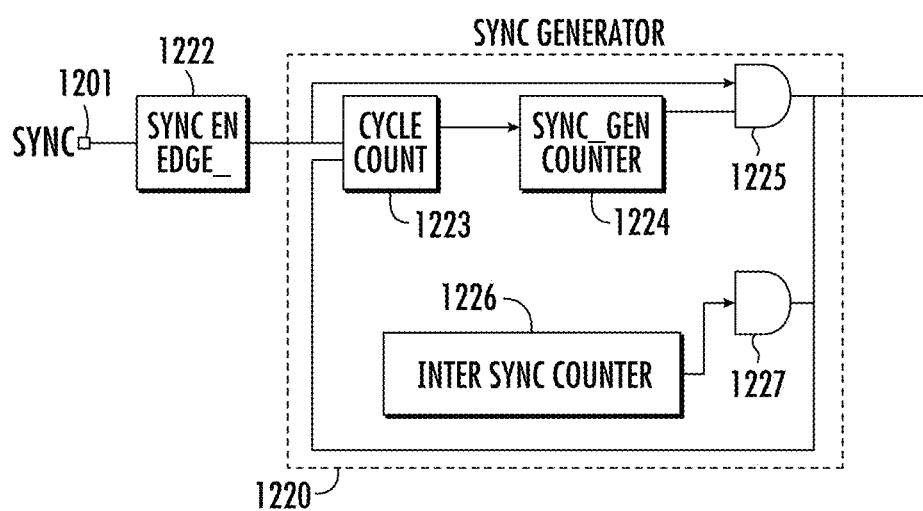
FIG. 12C is a system diagram of the SYNC Generator of FIG. 12 implemented in accordance with an ASST scheme.

FIG. 12C shows an implementation of the disclosed subject matter in accordance with the ASST scheme disclosed herein. Notably, FIG. 12C shows the SYNC generator of FIG. 12A modified based on the ASST scheme. As shown in FIG. 12C, in addition to the Cycle counter 1223, an internal synchronization counter 1226 is provided. The internal synchronization counter 1226 may generate an initialized signal to be used prior to complete activation of a display device. Further, the internal synchronization counter 1226 may be updated based on the SYNC counter such that when the SYNC_GEN counter does not provide a signal (e.g., when the device is in a sleep or idle state), the internal synchronization counter 1226 can provide the synchronization signal based on a previous SYNC_GEN counter signal.

As shown in FIG. 12C, the SYNC signal 1201 is provided to AND gate 1225 and the internal synchronization counter 1226 signal is provided to AND gate 1227. When the SYNC signal 1201 is active, SYNC generator outputs the VSYNC signal 1201 and when SYNC signal 1201 is not active, the SYNC generator outputs the signal generated by the internal synchronization counter 1226.

As a specific example, the SYNC signal 1201 period detect counter may be implemented using a 16-bit timing data register (e.g., 1666 us or 60.024 Hz). The SYNC signal 1201 period data may be written onto the internal synchronization counter 1226 when a new SYNC signal 1201 is provided. According to an implementation, a SYNC signal 1201 pulse with of less than 10 us may be ignored as noise.

It will be understood that although an IR proximity sensor is described above, a proximity sensor may be any applicable type of sensor that is able to detect the proximity of an external object to a display device. For example, the proximity sensor may be a long infrared (LIR) sensor, an ultrasound sensor, a radar sensor, an inductive sensor, a capacitive sensor, a photoelectric sensor, a through-beam sensor, a diffuser sensor, an ultrasonic sensor, or any other proximity detection sensor. Accordingly, it will be understood that although an IR proximity sensor is described, the embodiments of the present teachings can apply to any such applicable proximity detection sensor.

Those skilled in the art should readily appreciate that the devices, systems and techniques for under display sensing, as defined herein, may be implemented using any one or more of many available forms, techniques, and components, including but not limited to via non writeable storage media such as ROM devices, writeable storage media such as floppy disks, magnetic tapes, CDs, RAM devices, and other magnetic and optical media, conveyed through wired or wireless communication, through circuits, registers, and the like. The devices, systems and techniques disclosed herein may be implemented in a software executable by a processor or as a set of instructions embedded in a carrier wave. Alternatively, the devices, systems and techniques disclosed herein may be embodied in whole or in part using hardware components, such as Application Specific Integrated Circuits (ASICs), state machines, controllers or other hardware components or devices, or a combination of hardware, software, and firmware components.

While the present teachings have been particularly shown and described with references to embodiments thereof, it will be understood by those skilled in the art that various changes in form and details may be made therein without departing from the scope of the present teachings encompassed by the appended claims.

What is claimed is:

1. A method for operating a display device comprising:
transmitting a proximity signal from a proximity sensor, the proximity sensor being positioned under a lower surface of a surface layer with an illumination component being positioned between the surface layer and the proximity sensor, in response to the illumination component being deactivated;
receiving a reflected proximity signal based on the proximity signal;
modifying an operation of the display device based on a proximity value determined based on the reflected proximity signal; and
modifying a sensing rate of the proximity sensor based on a state of the display device determined based on the reflected proximity signal,
wherein the state of the display device is determined to be in one of a stable state or a transition state where the sensing rate of the proximity sensor is lower when the display device is in the stable state compared to the sensing rate of the proximity sensor when the display device is in the transition state.

2. The method of claim 1, wherein the modifying the operation of the display device includes any one or a combination of activating the illumination component, deactivating the illumination component, or modifying a property of the illumination component.

3. The method of claim 1, wherein the modifying the operation of the display device is based on comparing the proximity value against one or more threshold values.

4. The method of claim 3, wherein the modifying includes deactivating the illumination component in response to the proximity value being larger than a high threshold (HTH) value.

5. The method of claim 3, wherein the modifying includes activating the illumination component in response to the proximity value being smaller than a low threshold (LTH) value.

6. The method of claim 1, wherein the modifying the sensing rate of the proximity sensor is based on comparing the proximity sensor sensing rate against one or more ranges of proximity values.

7. The method of claim 1, wherein the modifying the sensing rate of the proximity sensor includes any one of maintaining the sensing rate, increasing the sensing rate, or decreasing the sensing rate.

8. The method of claim 1, further comprising determining a distance between the display device and an object external to the display device based on the reflected proximity signal.

9. A display device comprising:
a surface layer having an upper surface and a lower surface;
an illumination component positioned under the lower surface of the surface layer, the illumination component configured to activate and deactivate;
a proximity sensor positioned under the lower surface of the surface layer such that the illumination component is positioned between the surface layer and the proximity sensor, the proximity sensor configured to:
transmit a proximity signal in response to the illumination component being deactivated; and
receive a reflected proximity signal based on the proximity signal; and a processor configured to:
modify an operation of the display device based on a proximity value determined based on the reflected proximity signal; and
modify a sensing rate of the proximity sensor based on a state of the display device determined based on the reflected proximity signal,
wherein the state of the display device is determined to be in one of a stable state or a transition state where the sensing rate of the proximity sensor is lower when the display device is in the stable state compared to the sensing rate of the proximity sensor when the display device is in the transition state.

10. The display device of claim 9, wherein the modifying the operation of the display device includes any one or a combination of activating the illumination component, deactivating the illumination component, or modifying a property of the illumination component.

11. The display device of claim 9, wherein the modifying the operation of the display device is based on comparing the proximity value against one or more threshold values.

12. The display device of claim 11, wherein the modifying includes deactivating the illumination component in response to the proximity value being larger than a high threshold (HTH) value.

13. The display device of claim 11, wherein the modifying includes activating the illumination component in response to the proximity value being smaller than a low threshold (LTH) value.

14. The display device of claim 9, wherein the modifying the sensing rate of the proximity sensor is based on comparing the proximity sensor sensing rate against one or more ranges of proximity values.

15. The display device of claim 9, wherein the modifying the sensing rate of the proximity sensor includes any one of maintaining the sensing rate, increasing the sensing rate, or decreasing the sensing rate.

16. The display device of claim 9, wherein the proximity sensor is further configured to determine a distance between the display device and an object external to the display device based on the reflected proximity signal.

* * * * *